(12) United States Patent
Kosaka et al.

(10) Patent No.: US 11,377,153 B2
(45) Date of Patent: Jul. 5, 2022

(54) VEHICLE REINFORCEMENT MEMBER AND VEHICLE CENTER PILLAR

(71) Applicants: TOYODA IRON WORKS CO., LTD., Toyota (JP); TOYOTA JIDOSHA KABUSHIKI KAISHA, Toyota (JP); HINO MOTORS, LTD., Hino (JP)

(72) Inventors: Hiroyasu Kosaka, Toyota (JP); Daisuke Teramoto, Toyota (JP); Masanori Izumoto, Hino (JP); Katsuya Igarashi, Hino (JP)

(73) Assignees: TOYODA IRON WORKS CO., LTD., Toyota (JP); TOYOTA JIDOSHA KABUSHIKI KAISHA, Toyota (JP); HINO MOTORS, LTD., Tokyo (JP)

( * ) Notice: Subject to any disclaimer, the term of this patent is extended or adjusted under 35 U.S.C. 154(b) by 264 days.

(21) Appl. No.: 16/765,939

(22) PCT Filed: Jul. 13, 2018

(86) PCT No.: PCT/JP2018/026514
§ 371 (c)(1),
(2) Date: May 21, 2020

(87) PCT Pub. No.: WO2019/102644
PCT Pub. Date: May 31, 2019

(65) Prior Publication Data
US 2020/0353990 A1    Nov. 12, 2020

(30) Foreign Application Priority Data

Nov. 21, 2017  (JP) .............................. JP2017-223773

(51) Int. Cl.
*B62D 25/04*    (2006.01)
*B62D 21/15*    (2006.01)
(Continued)

(52) U.S. Cl.
CPC ........... *B62D 25/04* (2013.01); *B62D 21/157* (2013.01); *B23K 11/11* (2013.01); *B23K 11/16* (2013.01);
(Continued)

(58) Field of Classification Search
CPC ...... B62D 25/04; B62D 21/157; B23K 11/11; B23K 11/16; B23K 2101/006; B23K 2103/04; B23K 11/00
(Continued)

(56) References Cited

U.S. PATENT DOCUMENTS 9,457,844 B2   10/2016   Yoshida
9,764,766 B2    9/2017   Yoshida
(Continued)

FOREIGN PATENT DOCUMENTS

EP        2 617 509 A1    7/2013
JP     2006-281956 A     10/2006
(Continued)

OTHER PUBLICATIONS

Aug. 7, 2018 International Search Report issued in International Patent Application No. PCT/JP2018/026514.
Jul. 2, 2021 Extended European Search Report issued in European Patent Application No. 18881046.9.

*Primary Examiner* — Pinel E Romain
(74) *Attorney, Agent, or Firm* — Oliff PLC

(57) ABSTRACT

An elongate vehicle reinforcement member having a U-shaped cross section, wherein the member is disposed inside and welded to a vehicle structural member, wherein the vehicle structural member includes opposite base lateral walls, the vehicle reinforcement member including: opposite reinforcement lateral walls extending in vehicle height and width directions, each having an outward edge on an outer side in vehicle width direction and an inward edge on an inner side; and a reinforcement connecting wall connecting
(Continued)

the outward edges of the lateral walls, each lateral wall together with the connecting wall forming a ridge, each lateral wall including a row of welding projections, each protruding outward over the entire width of the lateral wall, each welding projection having a raised welding surface wherein the reinforcement lateral wall is welded to the base lateral wall, the welding projections in each row being arranged at intervals along vehicle height direction.

8 Claims, 16 Drawing Sheets

(51) Int. Cl.
*B23K 103/04* (2006.01)
*B23K 101/00* (2006.01)
*B23K 11/11* (2006.01)
*B23K 11/16* (2006.01)
(52) U.S. Cl.
CPC .... *B23K 2101/006* (2018.08); *B23K 2103/04* (2018.08)

(58) Field of Classification Search
USPC ..................................................... 296/193.06
See application file for complete search history.

(56) References Cited

U.S. PATENT DOCUMENTS

| | | | |
|---|---|---|---|
| 10,035,324 | B2 | 7/2018 | Yasuyama et al. |
| 2015/0360725 | A1* | 12/2015 | Yoshida ............... B62D 21/157 |
| | | | 296/187.12 |
| 2020/0353990 | A1* | 11/2020 | Kosaka ............... B62D 21/157 |

FOREIGN PATENT DOCUMENTS

| | | |
|---|---|---|
| JP | 2011-37291 A | 2/2011 |
| JP | 2013-220807 A | 10/2013 |
| JP | 2015-202820 A | 11/2015 |
| JP | 2016-2817 A | 1/2016 |
| WO | 2005-075279 A1 | 8/2005 |

* cited by examiner

Amount of Springback (mm)

| Measurement Pointo | Embodiment (trapezoidal projection) | Comparative Example (semicircular projection) |
|---|---|---|
| P1 | 4.09 (−11.6%) | 4.64 |
| P2 | 2.44 (−20.5%) | 3.07 |
| P3 | 3.78 (−26.6%) | 5.15 |
| P4 | 4.11 (−36.3%) | 6.45 |
| P5 | 3.38 (−52.9%) | 7.18 |
| P6 | 3.90 (−46.5%) | 7.29 |
| P7 | 5.19 (−31.1%) | 7.53 |
| P8 | 3.02 (−24.3%) | 3.99 |
| P9 | 2.63 (−41.2%) | 4.47 |
| P10 | 3.23 (−45.3%) | 5.91 |
| P11 | 3.50 (−47.7%) | 6.69 |
| P12 | 3.59 (−47.3%) | 6.81 |
| P13 | 3.85 (−43.7%) | 6.84 |
| P14 | 4.20 (−37.1%) | 6.68 |
| P15 | 4.48 (−38.5%) | 7.29 |
| P16 | 3.94 (−36.3%) | 6.19 |
| P17 | 4.22 (−29.8%) | 6.01 |

FIG. 9

VEHICLE REINFORCEMENT MEMBER AND VEHICLE CENTER PILLAR

FIELD OF THE INVENTION

The disclosure relates to a vehicle reinforcement member and a vehicle center pillar.

DESCRIPTION OF THE RELATED ART

Various elongate vehicle reinforcement members have been proposed that are placed inside a vehicle structural member and joined to the structural member by welding. For example, the vehicle center pillar disclosed in Japanese Patent Application Publication No. 2013-220807 includes an outer panel with a hat-shaped cross section and a planar inner panel, forming a closed cross section, and a hinge reinforcement placed inside the outer panel and welded or otherwise joined to the outer panel. The hinge reinforcement is formed of a single sheet of steel bent by press forming to form a hat-shaped cross section.

The hinge reinforcement includes opposite lateral walls extending along the vehicle width direction to be placed on the inner sides of the outer panel lateral walls, and a planar connecting wall extending along the vehicle length direction to connect the edges on the outer side in the vehicle width direction of the hinge reinforcement lateral walls. Each hinge reinforcement lateral wall includes a row of joining projections protruding toward the outer panel lateral wall, and is welded at these joining projections to the outer panel lateral wall. The joining projections, also called raised surfaces, are arranged at intervals along the vehicle height direction, each extending from the outer edge of the hinge reinforcement lateral wall, toward the hinge reinforcement connecting wall, to about the center in the vehicle width direction of the hinge reinforcement lateral wall.

SUMMARY OF THE INVENTION

However, in order to improve the bending strength of the vehicle center pillar against a side collision from outside, it may be desired to increase the material strength of the hinge reinforcement and the cross-sectional size. Since the hinge reinforcement is placed inside the outer panel with their surfaces facing each other, surface positional accuracy at the upper end of the hinge reinforcement may be considered. A hinge reinforcement formed of a high-strength steel sheet with a thickness of about 1 to 2 mm and a tensile strength of 980 MPa or more pressed at room temperature or hot stamped may have a large amount of springback and thus a low accuracy of surface position.

One or more aspects of the disclosure is directed to a vehicle reinforcement member with reduced amount of springback in press forming and thus improved surface position accuracy, and a vehicle center pillar that includes such a reinforcement member.

The present disclosure, in one aspect, provides an elongate vehicle reinforcement member having a U-shaped cross section, wherein the vehicle reinforcement member is disposed inside a vehicle structural member and welded to the vehicle structural member, wherein the vehicle structural member comprises opposite base lateral walls, the vehicle reinforcement member comprising: opposite reinforcement lateral walls extending in vehicle height and width directions, each having an outward edge on an outer side in vehicle width direction and an inward edge on an inner side in vehicle width direction, wherein the reinforcement lateral walls are placed along inner sides of the base lateral walls of the vehicle structural member; and a reinforcement connecting wall connecting the outward edges of the reinforcement lateral walls, each reinforcement lateral wall together with the reinforcement connecting wall forming a ridge, each reinforcement lateral wall comprising a row of welding projections, each welding projection protruding outward over the entire width of the reinforcement lateral wall from the ridge to the inward edge of the reinforcement lateral wall, each welding projection having a raised welding surface at which the reinforcement lateral wall is welded to the base lateral wall, the welding projections in each row being arranged at intervals along vehicle height direction. This configuration, in some embodiments, reduces amount of springback in press forming of the vehicle reinforcement member, and thus improves accuracy of surface position.

The present disclosure, in another aspect, provides a vehicle center pillar vertically arranged on a side of a vehicle, wherein the vehicle reinforcement member configured as above is disposed inside. This configuration, in some embodiments, improves the bending strength of the vehicle center pillar.

BRIEF DESCRIPTION OF THE DRAWINGS

FIG. 9 is a table showing the results of an analysis conducted for amount of springback of the hinge reinforcement models of FIGS. 3 and 6.

DETAILED DESCRIPTION OF EMBODIMENTS

Vehicle reinforcement members and vehicle center pillars according to first to ninth embodiments of the disclosure will be described below in detail with reference to the drawings. First of all, a vehicle reinforcement member and a vehicle center pillar according to a first embodiment will be described with reference to FIGS. 1 to 9. The arrow with "FR" drawn in some figures indicates the vehicle upward direction, and the arrow with "UP" the vehicle upward direction. The arrow with "IN" indicates inward in the vehicle width direction. In the following descriptions, directional terms refer to these directions.

Figure 1:
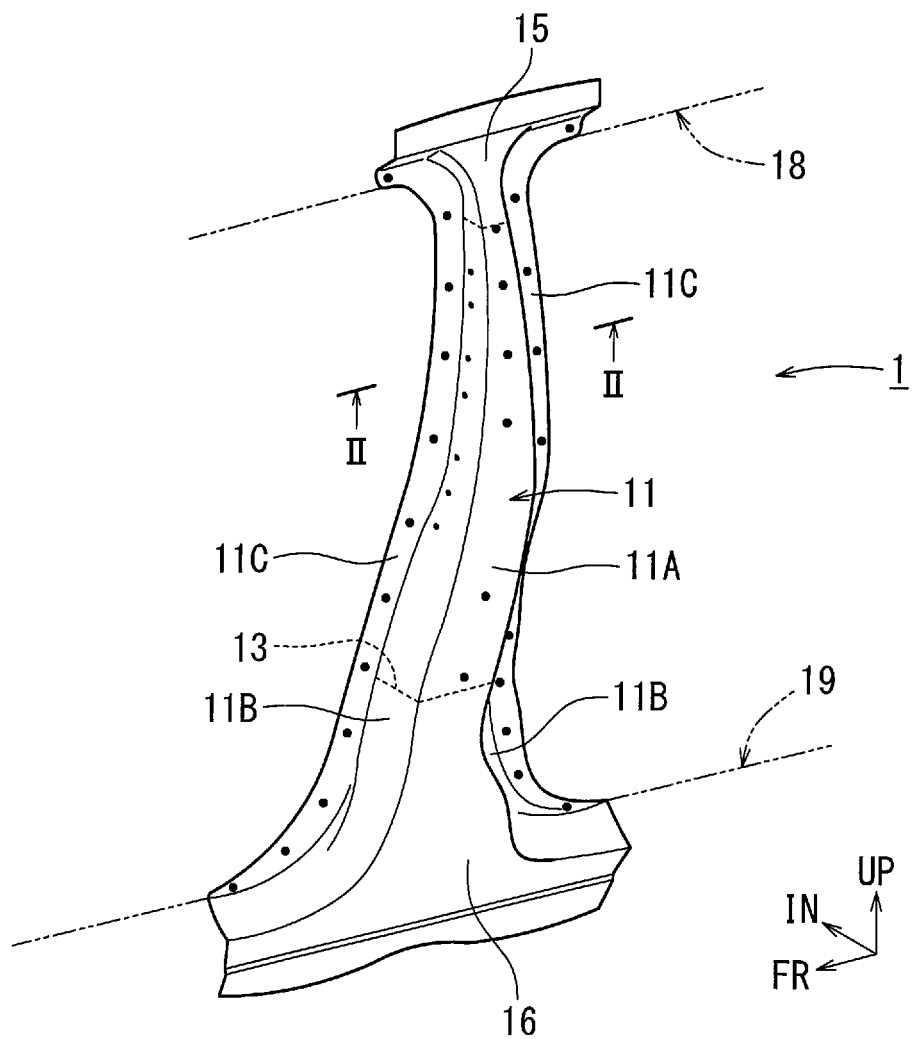
FIG. 1 is an overall view of an exemplary vehicle center pillar according to a first embodiment.
Figure 2:
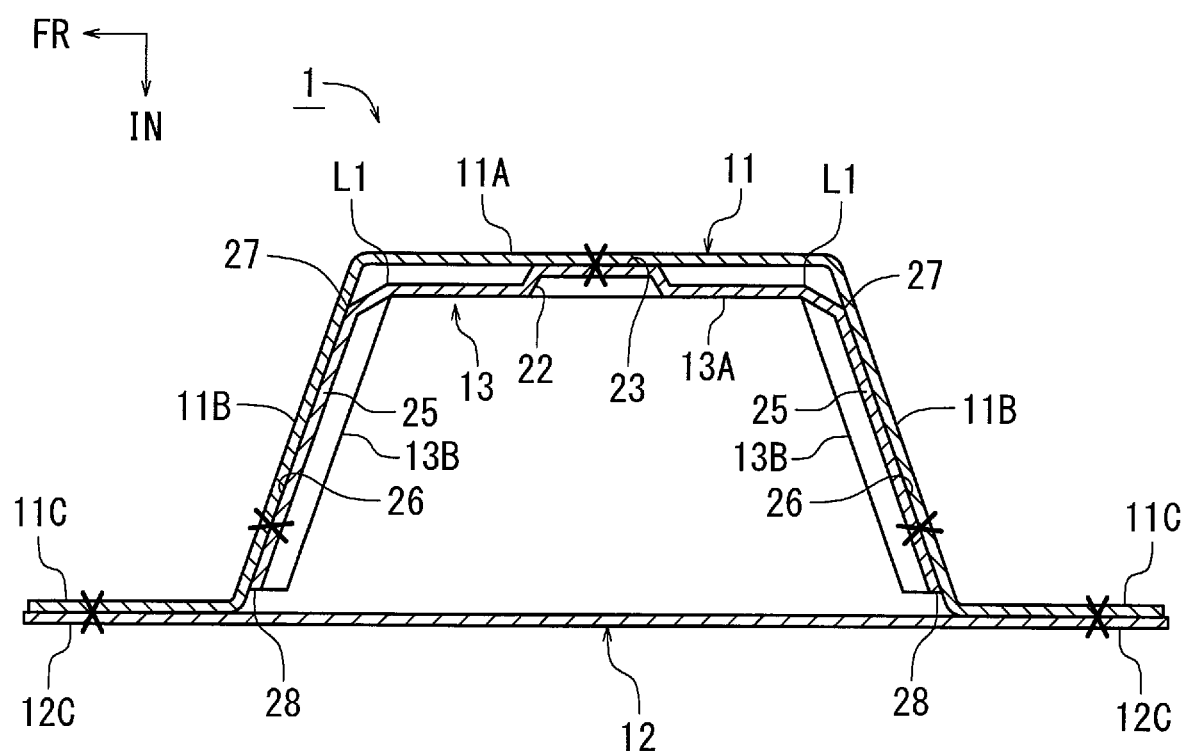
FIG. 2 is a cross-sectional view of the center pillar taken along line II-II in FIG. 1.

[First Embodiment.] FIGS. 1 and 2 show a general configuration of a vehicle center pillar 1 of the first embodiment. As shown in these figures, the vehicle center pillar 1 includes an elongate outer panel 11 that constitutes the outer side in a vehicle width direction of the vehicle center pillar 1, and inner panel 12 that constitutes the inner side in a vehicle width direction of the vehicle center pillar 1, and a hinge reinforcement (or vehicle reinforcement member) 13 disposed inside the outer panel 11.

The outer panel 11 has a hat-shaped cross section that is open inward in the vehicle width direction, and includes first flanges 11C extending outwardly from the open side edges. The inner panel 12 is formed as a substantially planar sheet, and includes second flanges 12C extending outwardly from the opposite edges of the inner panel 12.

Each second flange 12C of the inner panel 12 is overlapped in the vehicle width direction with the respective first flange 11C of the outer panel 11, and is joined by spot welding to form a closed cross section. The welding spots are indicated in FIG. 1 by filled circles and in FIG. 2 by X marks. The welding may be performed not only by spot welding but also by any other welding method such as laser welding.

Accordingly, the elongated vehicle center pillar 1 is a closed cross section structure extending in the vehicle height direction, defining a closed space inside. The vehicle center pillar 1 is joined to the roof side rail 18 via a generally T-shaped attachment portion 15 formed at the upper end of the outer panel 11, and to the side sill 19 via a generally T-shaped attachment portion 16 formed at the lower end of the outer panel 11, and is directed in the vehicle height direction.

The outer panel 11 is a sheet steel member formed of a sheet of high-tensile steel with a tensile strength of 1180 MPa or more (e.g. 1470 MPa) by pressing at room temperature or hot stamping. The outer panel 11 has base lateral walls 11B rising from the first flanges 11C on the opposite sides in the vehicle length direction outwardly in the vehicle width direction, and a first bottom wall 11A connecting the edges of the base lateral walls 11B on the outer side in the vehicle width direction. The inner panel 12 is a sheet steel member formed by pressing at room temperature of a sheet of high-tensile steel with a tensile strength equal to or lower than that of the outer panel 11 (e.g. 590 MPa).

As shown in FIGS. 1 to 4, the hinge reinforcement 13 is placed inside the outer panel 11, directed in the vehicle height direction. The hinge reinforcement 13 is a sheet steel member that may be formed of a single sheet of high-tensile steel with a tensile strength of 980 MPa or more (e.g. 1180 MPa) and a thickness of about 1 to 2 mm by a room temperature press or hot stamping. The hinge reinforcement 13 is formed in an elongated shape with a U-shaped cross section. The hinge reinforcement 13 includes opposite reinforcement lateral walls 13B placed along the inner sides of the base lateral walls 11B of the outer panel 11, and a reinforcement connecting wall 13A connecting the edges of the reinforcement lateral walls 13B on the outer side in the vehicle width direction.

The reinforcement connecting wall 13A is generally planar over the length and width but includes a bend line 21 at a location below the middle of the length, and the lower portion with respect to the bend line 21 is bent inwardly in the vehicle width direction. The reinforcement connecting wall 13A has six welding projections 22 vertically arranged at intervals, each protruding outwardly in the vehicle width direction by a height (e.g. 2 mm), and is spot welded at the welding projections 22 to the inner surface of the bottom wall 11A of the outer panel 11. The welding projections 22 are located at six positions: the center on the upper end edge; the centers at three heights within the section extending from the upper end to the bend line 21; the center at a generally middle height in the section extending from the bend line 21 to the lower end; and the center at the lower end.

Figure 3:
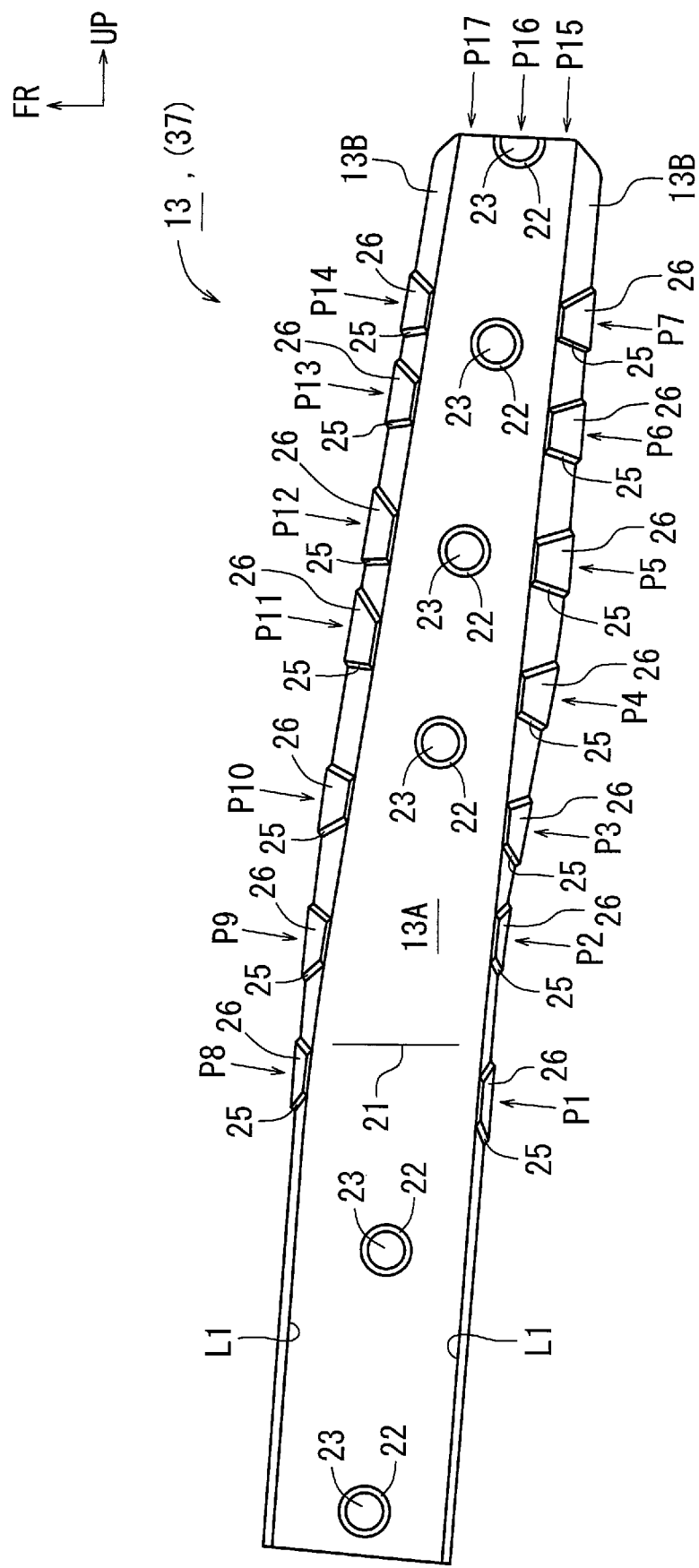
FIG. 3 is a plan view of a hinge reinforcement.
Figure 4:
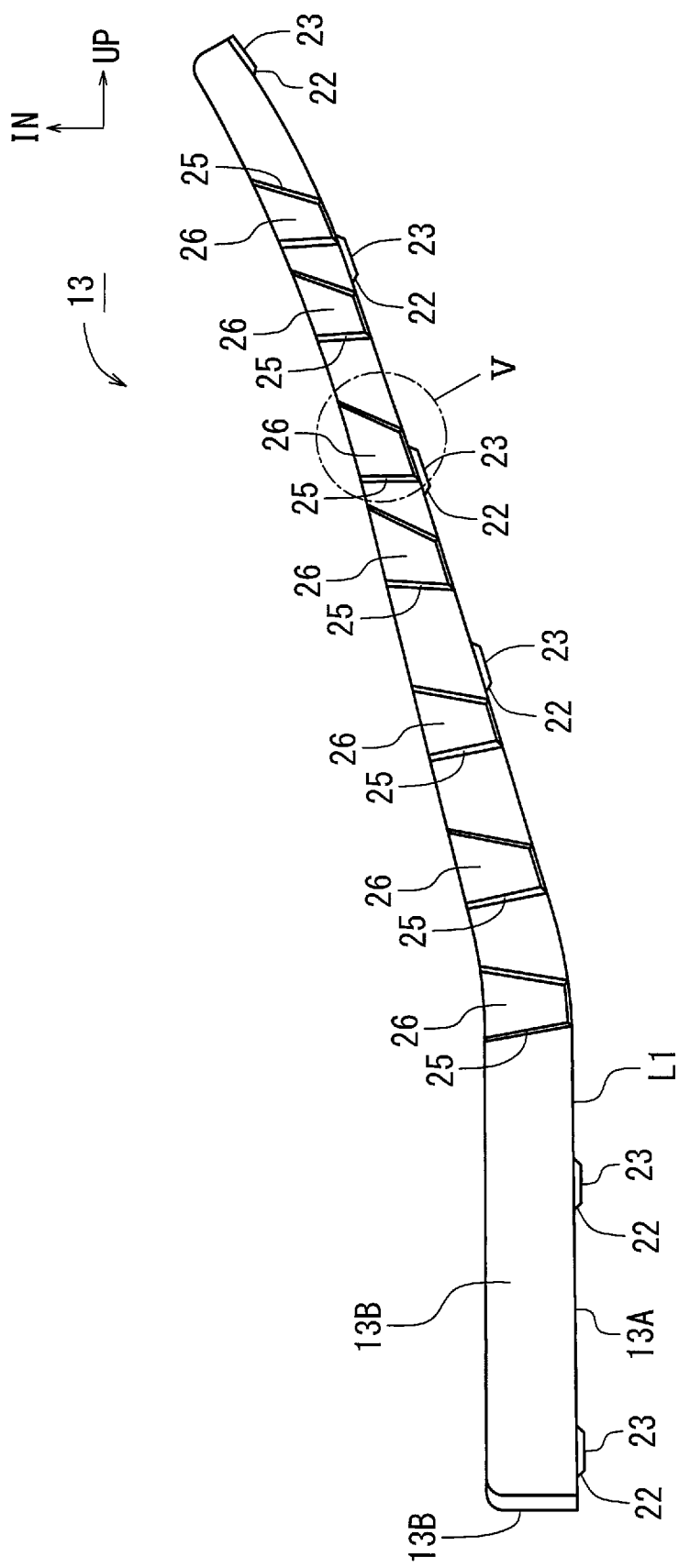
FIG. 4 is a side view of a hinge reinforcement.

As shown in FIG. 2 and FIG. 3, the outer surface of each welding projection 22, that is, each raised welding surface 23 is flat in order to secure joint strength of the spot weld joining the raised welding surface 23 and the bottom wall 11A of the outer panel 11. The shape of each welding projection 22 is not limited to semicircular or circular, but may be various shapes including rectangular, triangular, elliptic, and hexagonal.

Each reinforcement lateral wall 13B extends with a substantially constant width from the lower end to the location corresponding to the bend line 21, where it bends inwardly in the vehicle width direction along the reinforcement connecting wall 13A, with the width gradually narrowing toward the upper end. Each reinforcement lateral wall 13B includes a row of welding projections 25 arranged at intervals along the vehicle height direction, each protruding toward the base lateral wall 11B of the outer panel 11, and is spot welded at the welding projections 25 to the inner surface of the base lateral wall 11B.

Figure 5:
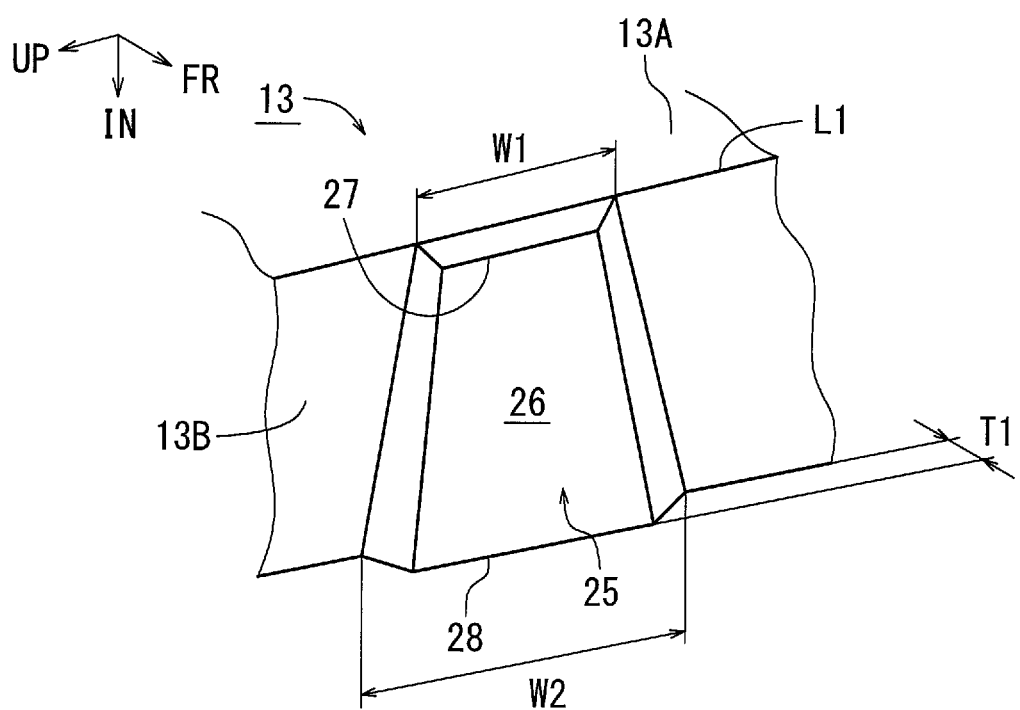
FIG. 5 is an enlarged perspective view of portion V of the hinge reinforcement in FIG. 4.

Each welding projection 25 protrudes from the reinforcement lateral wall 13B outward by a height T1 (e.g. T1=2 mm) (see FIG. 5). The welding projections 25 in each row are located at six heights within the section extending from the upper end of the reinforcement lateral wall 13B to the bend line 21 and at a height near the bend line 21 on the lower side; the welding projections 25 totals fourteen.

As shown in FIGS. 2 to 5, each welding projection 25 protrudes outward over the entire width from the ridges L1 formed by the reinforcement lateral walls 13B and reinforcement connecting wall 13A to the inner edge in the vehicle width direction of the reinforcement lateral walls 13B. Each welding projection 25 has a front shape that is sideways trapezoidal, in which the first width W1 at the edge proximate to the ridge L1 is smaller than the second width W2 at the edge on the inner side in the vehicle width direction. The edge of the welding projection 25 proximate to the ridge L1 is chamfered obliquely inward in the vehicle width direction along the ridge L1.

As shown in FIGS. 2 and 5, the outer surface of each welding projection 25, i.e. the raised welding surface 26, is planar in order to secure joint strength of the spot weld joining the raised welding surface 26 and the base lateral wall 11B of the outer panel 11. Accordingly, each raised welding surface 26 is flat over substantially the entire width from each ridge L1 to the vehicle width direction inner edge of the reinforcement lateral wall 13B, and has a sideways trapezoidal front shape in which the width at the edge 27 proximate to the ridge L1 is smaller than the width at the edge 28 on the inner side in the vehicle width direction.

As shown in FIGS. 1 and 2, each reinforcement lateral wall 13B is spot welded on the raised welding surfaces 26 to the inner surface of the base lateral wall 11B of the outer panel 11, at spots located more inward in the vehicle width direction than the center of each raised welding surface 26. The welding spots are indicated in FIG. 1 by filled circles and in FIG. 2 by X marks. The welding may be performed not only by spot welding but also by any other welding method such as laser welding.

Advantages of the welding projections 25 of the hinge reinforcement 13 of the first embodiment will now be described. First of all, the configuration of a second hinge reinforcement 31 as a comparative example will be described with reference to FIGS. 6 to 8. The same reference numerals as those of the hinge reinforcement 13 indicate the same or corresponding features as those of the hinge reinforcement 13.

Figure 6:
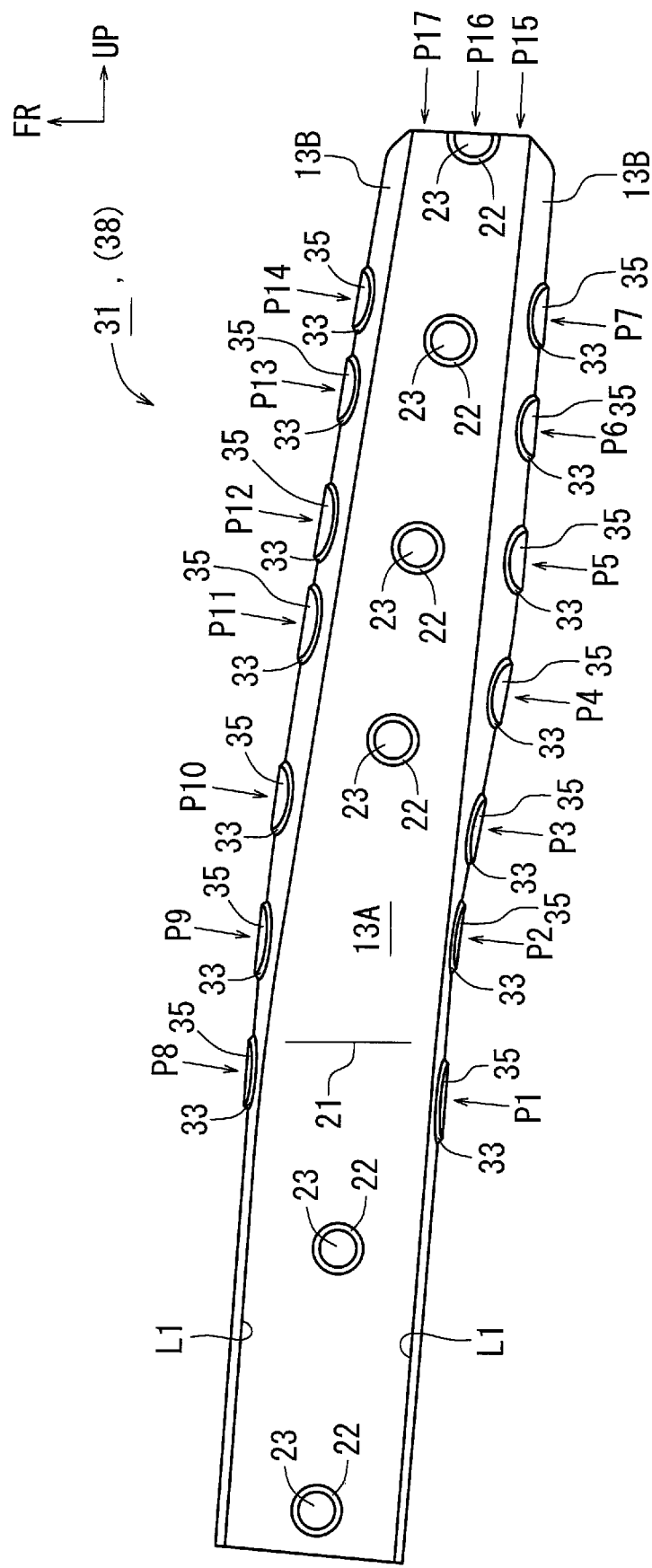
FIG. 6 is an illustrative plan view of a comparative, second model of a hinge reinforcement for an analysis.
Figure 7:
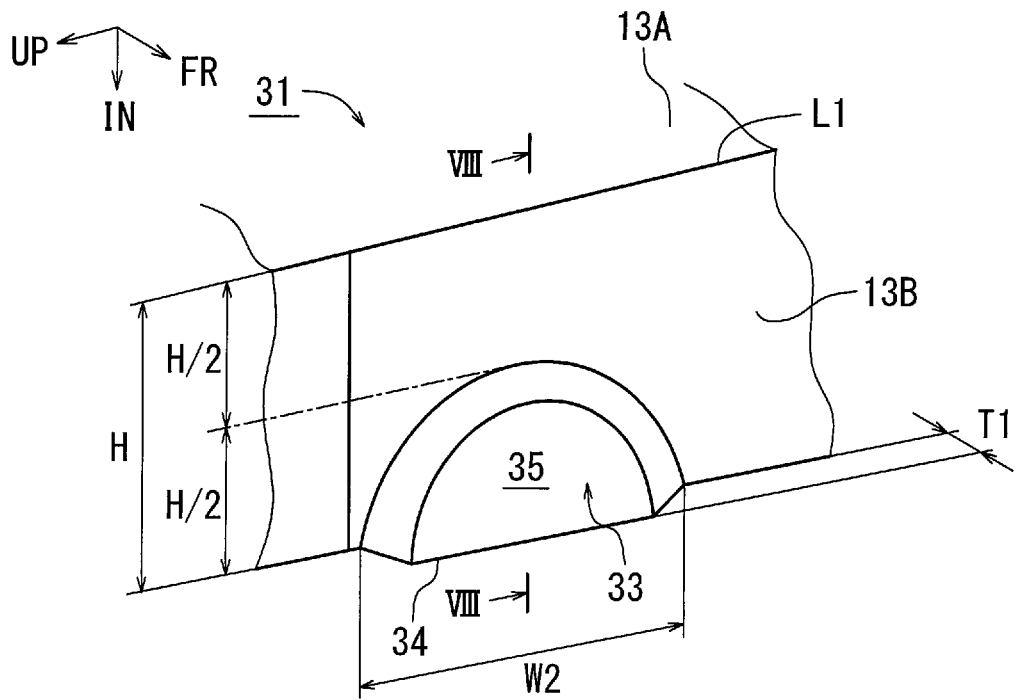
FIG. 7 is an enlarged perspective view of a welding projection of FIG. 6.
Figure 8:
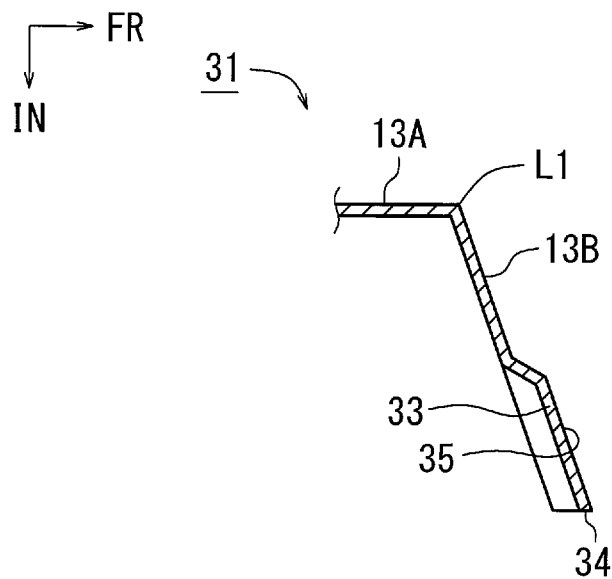
FIG. 8 is a cross-sectional view of the welding projection taken along line VIII-VIII in FIG. 7.

The configuration of the second hinge reinforcement 31 is generally the same as that of the hinge reinforcement 13. However, the second hinge reinforcement 31 is different in that it includes welding projections 33 as shown in FIGS. 6 to 8 instead of the welding projections 25. The other features may be the same as those of the hinge reinforcement 13, and will not be described again.

The configuration of the welding projections 33 will be described with reference to FIGS. 6 to 8. As shown in FIGS. 6 to 8, each welding projection 33 extends from the edge of the reinforcement lateral wall 13B on the inner side in the vehicle width direction toward the ridge L1, and terminates at the center in the vehicle width direction of the reinforcement lateral wall 13B. Each welding projection 33 protrudes from each reinforcement lateral wall 13B outwardly by a height T1 (e.g. T1=2 mm) (see FIG. 7), and has a semicircular front shape.

The edge on the inner side in the vehicle width direction of each welding projection 33 has the same width W2 as the second width W2 of the edge on the inner side in the vehicle width direction of the welding projection 25 of the hinge reinforcement 13. As shown in FIGS. 7 and 8, the outer surface of each welding projection 33, i.e. the raised welding surface 35 having a semicircular front shape, is planar in order to secure joint strength of the spot weld joining the raised welding surface 35 and the base lateral wall 11B of the outer panel 11.

A first frame model 37 (see FIG. 3) according to the hinge reinforcement 13 configured as described above as well as a second frame model 38 (see FIG. 6) according to the second hinge reinforcement 31 were created and analyzed by computer aided engineering (CAE) for the amount of springback at measurement points P1 to P17.

As shown in FIGS. 3 and 6, for each of the first and second frame models 37 and 38, measurement points P1 to P7 and P8 to P14 are assigned to the rows of welding projections 25 (or 33) in the bottom-up order, each being defined at the center of the edge 28 (or 34) of the welding projection 25 (or 33) on the inner side in the vehicle width direction. For each of the frame models 37 and 38, measurement points P15 to P17 are defined at the rear end, center, and front end, respectively, along the vehicle length direction on the upper end edge of the model. Each of the frame models 37 and 38 was modeled as a sheet steel member formed of a sheet of high-strength steel with a thickness of 1.0 mm and a tensile strength of 980 MPa by pressing at room temperature or hot stamping. In both frame models 37 and 38, the height of each of the welding projections 25 and 33 protruding outwardly from the reinforcement lateral wall 13B was set to T1=2 mm.

FIG. 9 shows the results of the CAE analysis. As shown in FIG. 9, the amounts of springback at measurement points P7 and P14 located in the welding projections 25 in the uppermost part of the reinforcement lateral walls 13B of the first frame model 37 (Embodiment) were smaller by 31.1% and 37.1%, respectively, than the amounts of springback at measurement points P7 and P14 located in the welding projections 33 in the uppermost part of the reinforcement lateral walls 13B of the second frame model 38 (Comparative Example).

The amounts of springback at measurement points P15 to P17 on the upper end edge of the first frame model 37 (Embodiment) were smaller by 38.5%, 36.3% and 29.8% than those at measurement points P15 to P17 on the upper end edge of the second frame model 38 (Comparative Example).

Accordingly, the first frame model 37 (Embodiment) is considered to have an increased rigidity and a reduced amount of springback in press forming because the welding projections 25 has a sideways trapezoidal front shape and extends over the entire width from the ridge L1 to the edge of the reinforcement lateral wall 13B on the inner side in the vehicle width direction. On the other hand, the second frame model 38 (Comparative Example) is considered to have a lower rigidity than the first frame model 37 (Embodiment) because the end of each welding projection 33 proximate to the ridge L1 is located at the center in the vehicle width direction of the reinforcement lateral wall 13B. It is considered that this is the reason why the second frame model 38 (Comparative example) showed a larger amount of springback at each of measurement points P1 to P17 than the first frame model 37 (Embodiment).

As described above, the hinge reinforcement (or vehicle reinforcement member) 13 of the first embodiment includes the rows of welding projections 25, each welding projection 25 including the raised welding surface 26 to be welded to the base lateral wall 11B of the outer panel 11. Each welding projection 25 protrudes outward from the reinforcement lateral wall 13B by a height T1 (e.g. T1=2 mm) over the entire width of the reinforcement lateral walls 13B, from the ridge L1 to the edge on the inner side in the vehicle width direction. This configuration increases the rigidity of the elongate hinge reinforcement (or vehicle reinforcement member) 13 having a U-shaped cross section and reduces amount of springback in press forming, thereby improving the surface position accuracy at the end of the hinge reinforcement.

Further, each welding projection 25 has a sideways trapezoidal front shape in which the first width W1 at the edge proximate to the ridge L1 is smaller than the second width W2 of the edge on the inner side in the vehicle width direction. The elongate hinge reinforcement 13 having a U-shaped cross section is open inward in the vehicle width direction. This facilitates removal of the hinge reinforcement 13 from the press die, leading to improved production efficiency.

The edge of the welding projection 25 proximate to the ridge L1 is chamfered obliquely inward in the vehicle width direction along the ridge L1. This allows the ridges L1 to be formed linearly. This configuration avoids stress concentration at the foot of each welding projection 25 proximate to the ridge L1, and thereby improves the bending strength of the hinge reinforcement 13. The configuration also improve the bending strength of the vehicle center pillar 1 against impact on the vehicle center pillar 1 from the outer side of the vehicle.

Figure 10:
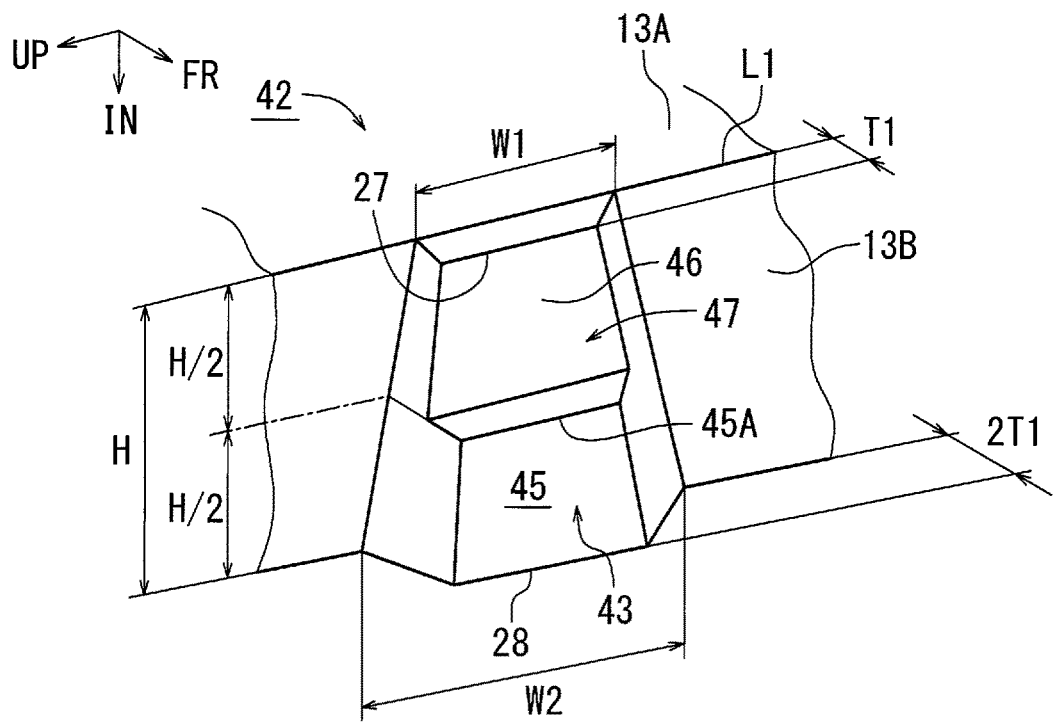
FIG. 10 is an enlarged perspective view of a welding projection according to a second embodiment.

[Second embodiment.] The configuration of the vehicle center pillar 41 of a second embodiment will now be described with reference to FIGS. 10 and 11. The same reference numerals as those of the configuration of the vehicle center pillar 1 of the first embodiment shown in FIGS. 1 to 9 indicate the same or corresponding features as those of the configuration of the vehicle center pillar 1 of the first embodiment.

The configuration of the vehicle center pillar 41 of the second embodiment is substantially the same as the configuration of the vehicle center pillar 1 of the first embodiment. However, the vehicle center pillar 41 of the second embodiment is different in that it includes a hinge reinforcement 42 instead of the hinge reinforcement 13.

The hinge reinforcement 42 has substantially the same configuration as the hinge reinforcement 13 of the first embodiment. However, the hinge reinforcement 42 is different in that it includes a second embodiment welding projection 43 instead of the first embodiment welding projection 25. The other features may be the same as those of the hinge reinforcement 13 of the first embodiment, and will not be described again.

The configuration of the second embodiment welding projection 43 will be described with reference to FIGS. 10 and 11. As shown in FIGS. 10 and 11, the welding projection 43 includes a raised welding surface 45 whose front shape is sideways trapezoidal and which, as compared with the first embodiment raised welding surface 26, further protrudes outward by a height T1 (e.g. T1=2 mm) over the section that extends along the vehicle width direction from the inward edge 28 to the center of the reinforcement lateral wall 13B. In other words, the width of the second embodiment raised welding surface 45 as measured in the vehicle width direction is about half H/2 of the width of the first embodiment raised welding surface 26 as measured in the vehicle width direction.

Accordingly, the second embodiment raised welding surface 45 protrudes outward by a height 2T1 (e.g. 2T1=4 mm) that is twice the raising height T1 of the first embodiment raised welding surface 26. The second embodiment raised welding surface 45 is flat in order to secure the joint strength of the spot weld joining the raised welding surface 45 and the base lateral wall 11B of the outer panel 11. The raising height of the second embodiment raised welding surface 45 with respect to the base surface of the reinforcement lateral wall 13B is not limited to twice the raising height T1 of the first embodiment raised welding surface 26, but can be any larger than the height T1.

Consequently, the second embodiment welding projection 43 includes a step surface 46 which is lowered inward by a height difference T1 (e.g. T1=2 mm) over the section that extends from the edge 45A on the outer side in the vehicle width direction of the raised welding surface 45 to the edge 27 proximate to the ridge L1. Specifically, the step surface 46 extends from the edge 27 of the welding projection 43 proximate to the ridge L1, inwardly in the vehicle width direction, to a location slightly more outward in the vehicle width direction than the edge 45A on the outer side in the vehicle width direction of the raised welding surface 45. The step surface 46 then turns outward to the edge 45A on the outer side in the vehicle width direction of the raised welding surface 45. As a result, the second embodiment welding projection 43 includes, on the side of the raised welding surface 45 proximate to the ridge L1, a clearance area 47 having a smaller outward raising height than the raised welding surface 45.

Figure 11:
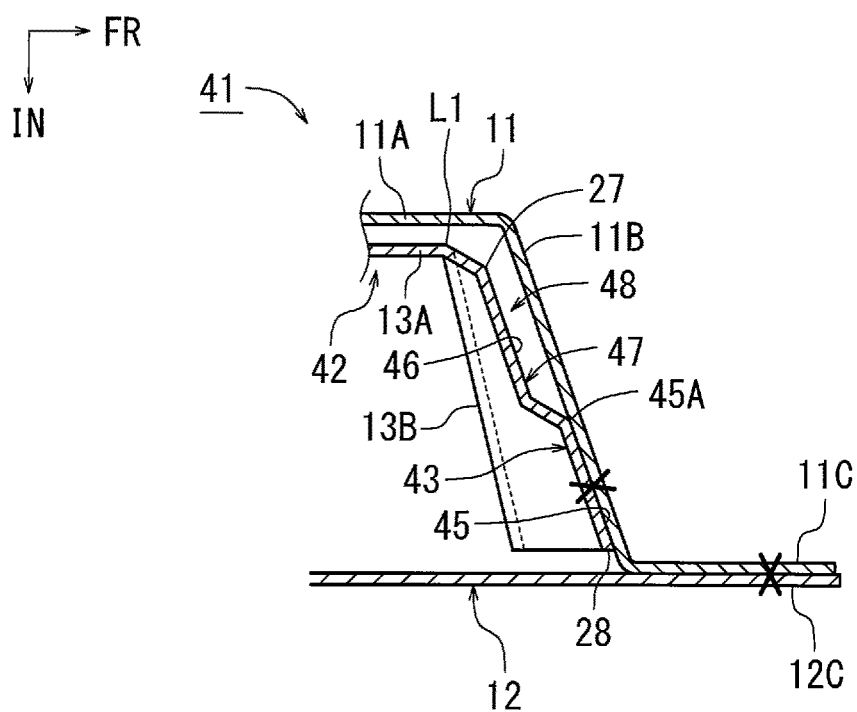
FIG. 11 is a cross-sectional view of a main part of the welding projection of the second embodiment welded to the inner side of a vehicle center pillar.

Accordingly, as shown in FIG. 11, when the reinforcement lateral walls 13B are spot welded at each raised welding surface 45 to the inner side of the base lateral walls 11B of the outer panel 11, a gap 48 is formed between the step surface 46 forming the clearance area 47 and the inner surface of the base lateral wall 11B of the outer panel 11. In FIG. 11, the welding spots are indicated by X marks. The welding may be performed not only by spot welding but also by any other welding method such as laser welding.

The hinge reinforcement (or vehicle reinforcement member) 42 of the second embodiment configured as described above may have the same advantages as the first embodiment hinge reinforcement 13 as well as the following. The second embodiment welding projection 43 whose front shape is sideways trapezoidal includes the raised welding surface 45 that protrudes outward by a height 2T1 (e.g. 2T1=4 mm) over the section that extends along the vehicle width direction from the inward edge 28 to the center of the reinforcement lateral wall 13B. This configuration allows an increased raising height of the raised welding surface 45 with respect to the reinforcement lateral wall 13B, and thereby prevents wrinkles from occurring in press forming of the hinge reinforcement 42.

Furthermore, the configuration reduces the area to be controlled within the raised welding surface 45 and thereby facilitates the dimensional quality control of the hinge reinforcement 42.

The clearance area 47 of the second embodiment welding projection 43 is formed by the step surface 46 that is recessed inward from the raised welding surface 45 by a height difference T1 (e.g. T1=2 mm). This configuration facilitates press forming of the hinge reinforcement 42. When each raised welding surface 45 is spot welded to the inner side of the base lateral wall 11B of the outer panel 11, a gap 48 is formed between the step surface 46 forming the clearance area 47 and the inner surface of the base lateral wall 11B of the outer panel 11. This configuration prevents, when the vehicle center pillar 41 vibrates, unpleasant noise that could be caused by the outer surface of the reinforcement lateral wall 13B of the hinge reinforcement 42 rubbing or hitting the inner surface of the base lateral wall 11B of the outer panel 11.

Figure 12:
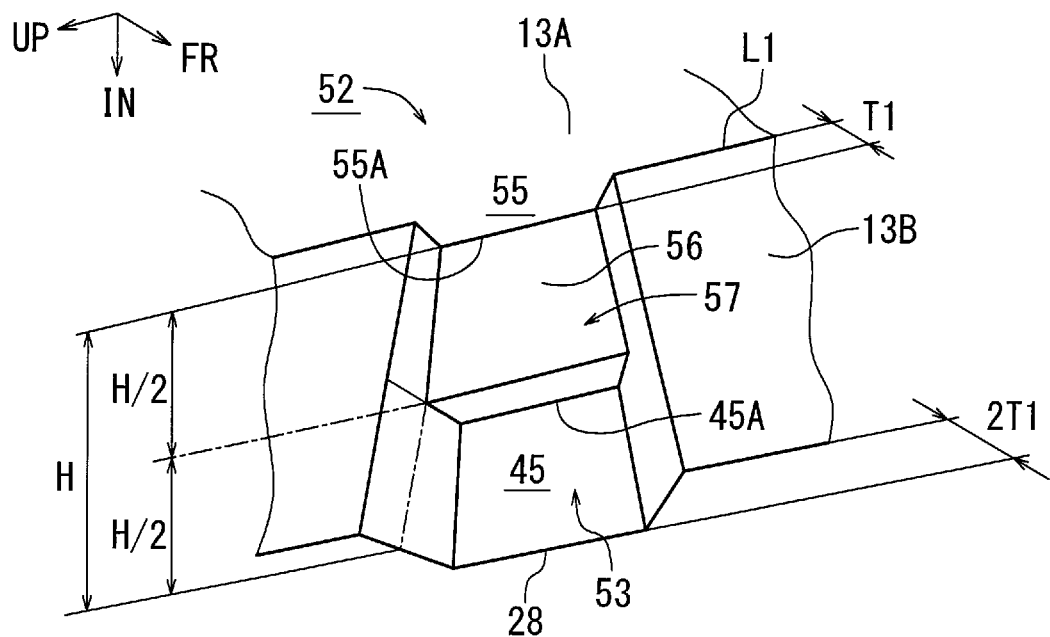
FIG. 12 is an enlarged perspective view of a welding projection according to a third embodiment.

[Third embodiment.] The configuration of the vehicle center pillar 51 of a third embodiment will now be described with reference to FIGS. 12 and 13. The same reference numerals as those of the configuration of the vehicle center pillar 1 of the first embodiment shown in FIGS. 1 to 9 indicate the same or corresponding features as those of the configuration of the vehicle center pillar 1 of the first embodiment. The same reference numerals as those of the configuration of the vehicle center pillar 41 of the second embodiment shown in FIGS. 10 and 11 indicate the same or corresponding features as those of the configuration of the vehicle center pillar 41 of the second embodiment.

The configuration of the vehicle center pillar 51 of the third embodiment is substantially the same as the configuration of the vehicle center pillar 41 of the second embodiment. However, the vehicle center pillar 51 of the third embodiment is different in that it includes a hinge reinforcement 52 instead of the hinge reinforcement 42.

The hinge reinforcement 52 has substantially the same configuration as the hinge reinforcement 42 of the second embodiment. However, the hinge reinforcement 52 is different in that it includes a third embodiment welding projection 53 instead of the second embodiment welding projection 43. The other features may be the same as those of the hinge reinforcement 42 of the second embodiment, and will not be described again.

The configuration of the third embodiment welding projection 53 will be described with reference to FIGS. 12 and 13. As shown in FIGS. 12 and 13, the welding projection 53 has substantially the same configuration as the second embodiment welding projection 43. However, the end surface of the third embodiment welding projection 53 proximate to the ridge L1 is formed as an extended portion 55 by coplanarly extending the surface of the reinforcement connecting wall 13A on the outer side in the vehicle width direction outward by a height T1 (e.g. T1=2 mm).

Consequently, the third embodiment welding projection 53 includes a step surface 56 which is lowered inward by a height difference T1 (e.g. T1=2 mm) and extends from the edge 45A on the outer side in the vehicle width direction of the raised welding surface 45 to the outer edge 55A of the extended portion 55.

Specifically, the step surface 56 extends from the outer edge 55A of the extended portion 55, inwardly in the vehicle width direction to a location slightly more outward in the vehicle width direction than the edge 45A on the outer side in the vehicle width direction of the raised welding surface 45. The step surface 56 then turns outward to the edge 45A on the outer side in the vehicle width direction of the raised welding surface 45.

As a result, the third embodiment welding projection 53 includes, on the side of the raised welding surface 45 proximate to the ridge L1, a clearance area 57 having a smaller outward raising height than the raised welding surface 45. The third embodiment welding projection 53 includes the raised welding surface 45 that protrudes outward by a height 2T1 (e.g. 2T1=4 mm) over the section that extends along the vehicle width direction from the inward edge 28 to the center of the reinforcement lateral wall 13B.

Figure 13:
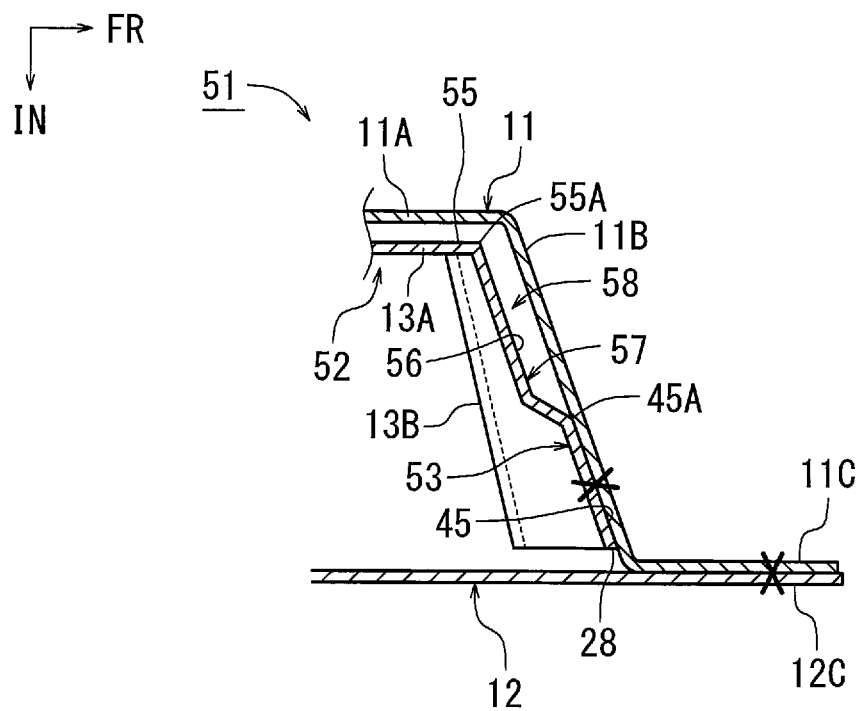
FIG. 13 is a cross-sectional view of a main part of the welding projection of the third embodiment welded to the inner side of a vehicle center pillar.

Accordingly, as shown in FIG. 13, when the reinforcement lateral walls 13B are spot welded at each raised welding surfaces 45 to the inner side of the base lateral walls 11B of the outer panel 11, a gap 58 is formed between the step surface 56 that forms the clearance area 57 and the inner surface of the base lateral wall 11B of the outer panel 11. In FIG. 13, the welding spots are indicated by X marks. The welding may be performed not only by spot welding but also by any other welding method such as laser welding.

The hinge reinforcement (or vehicle reinforcement member) 52 of the third embodiment configured as described above may have the same advantages as the second embodiment hinge reinforcement 42 as well as the following. The inner surface of the extended portion 55 of the third embodiment welding projection 53 is coplanar with the inner surface of the reinforcement connecting wall 13A. This configuration facilitates press forming of the hinge reinforcement 52.

Figure 14:
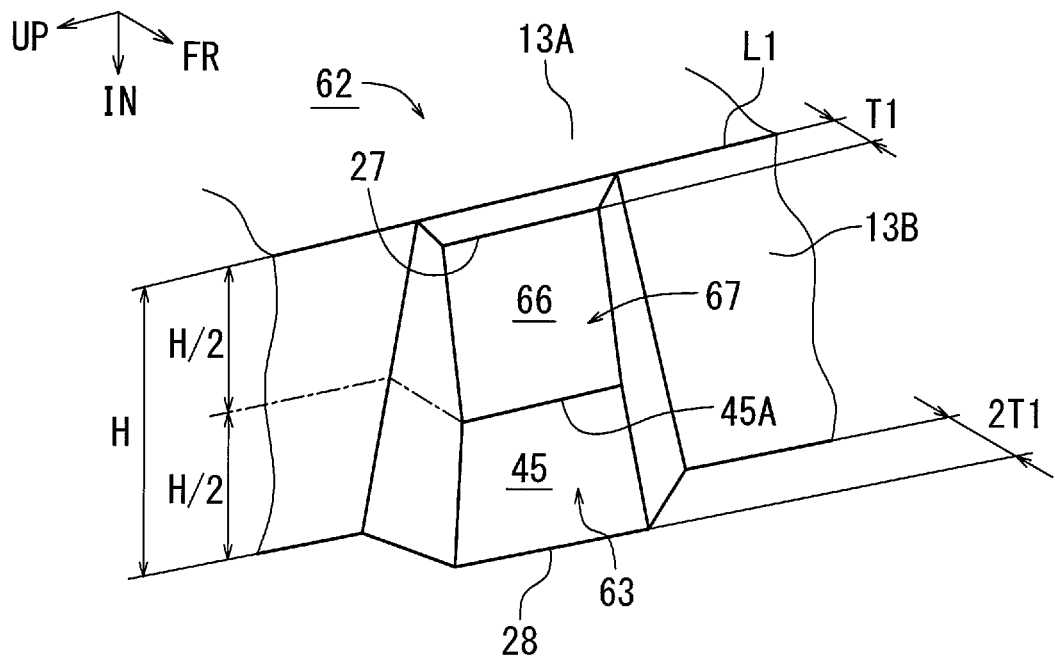
FIG. 14 is an enlarged perspective view of a welding projection according to a fourth embodiment.

[Fourth embodiment.] The configuration of the vehicle center pillar 61 of a fourth embodiment will now be described with reference to FIGS. 14 and 15. The same reference numerals as those of the configuration of the vehicle center pillar 1 of the first embodiment shown in FIGS. 1 to 9 indicate the same or corresponding features as those of the configuration of the vehicle center pillar 1 of the first embodiment. The same reference numerals as those of the configuration of the vehicle center pillar 41 of the second embodiment shown in FIGS. 10 and 11 indicate the same or corresponding features as those of the configuration of the vehicle center pillar 41 of the second embodiment.

The configuration of the vehicle center pillar 61 of the fourth embodiment is substantially the same as the configuration of the vehicle center pillar 41 of the second embodiment. However, the vehicle center pillar 61 of the fourth embodiment is different in that it includes a hinge reinforcement 62 instead of the hinge reinforcement 42.

The hinge reinforcement 62 has substantially the same configuration as the hinge reinforcement 42 of the second embodiment. However, the hinge reinforcement 62 is different in that it includes a fourth embodiment welding projection 63 instead of the second embodiment welding projection 43. The other features may be the same as those of the hinge reinforcement 42 of the second embodiment, and will not be described again.

The configuration of the fourth embodiment welding projection 63 will be described with reference to FIGS. 14 and 15. As shown in FIGS. 14 and 15, the welding projection 63 includes a raised welding surface 45 whose front shape is sideways trapezoidal and protrudes outward by a height 2T1 (e.g. 2T1=4 mm), which is twice the raising height T1 of the first embodiment raised welding surface 26, over the section that extends along the vehicle width direction from the inward edge 28 to the center of the reinforcement lateral wall 13B. In other words, the width of the raised welding surface 45 as measured in the vehicle width direction is about half H/2 of the width of the first embodiment raised welding surface 26 as measured in the vehicle width direction.

The fourth embodiment welding projection 63 includes an inclined surface 66 extending obliquely inward over the entire section from the edge 45A on the outer side in the vehicle width direction of the raised welding surface 45 to the edge 27 of the welding projection 63 proximate to the ridge L1. This creates, on the side of the raised welding surface 45 proximate to the ridge L1, a clearance area 67 having an outward raising height smaller than that of the raised welding surface 45.

Figure 15:
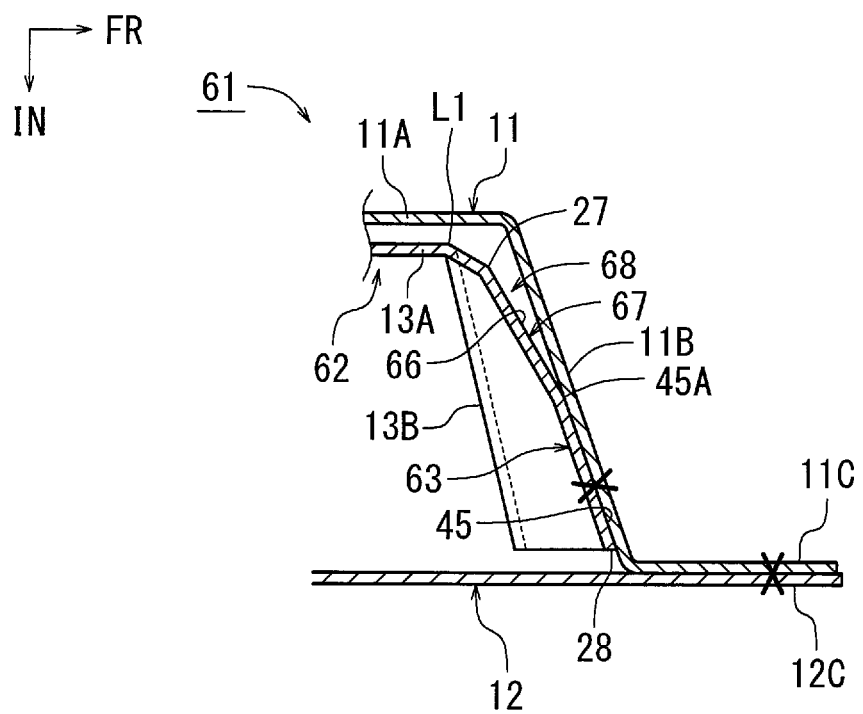
FIG. 15 is a cross-sectional view of a main part of the welding projection of the fourth embodiment welded to the inner side of a vehicle center pillar.

Accordingly, as shown in FIG. 15, when the reinforcement lateral walls 13B are spot welded at the raised welding surfaces 45 to the inner side of the base lateral walls 11B of the outer panel 11, a gap 68 is formed between the inclined surface 66 forming the clearance area 67 and the inner surface of the base lateral wall 11B of the outer panel 11. In FIG. 15, the welding spots are indicated by X marks. The welding may be performed not only by spot welding but also by any other welding method such as laser welding.

The hinge reinforcement (or vehicle reinforcement member) 62 of the fourth embodiment configured as described above may have the same advantages as the first embodiment hinge reinforcement 13 as well as the following. The fourth embodiment welding projection 63 whose front shape is sideways trapezoidal includes the raised welding surface 45 that protrudes outward by a height 2T1 (e.g. 2T1=4 mm) over the section that extends along the vehicle width direction from the inward edge 28 to the center of the reinforcement lateral wall 13B. This configuration allows an increased raising height of the raised welding surface 45 with respect to the reinforcement lateral wall 13B, and thereby prevents wrinkles from occurring in press forming of the hinge reinforcement 62.

Furthermore, the configuration reduces the area to be controlled within the raised welding surface 45 and thereby facilitates the dimensional quality control of the hinge reinforcement 62.

The clearance area 67 of the fourth embodiment welding projection 63 is formed by the inclined surface 66 which inclines obliquely inwardly over the entire section that extends from the edge 45A on the outer side in the vehicle width direction of the raised welding surface 45 to the edge 27 of the welding projection 63 proximate to the ridge L1. This configuration facilitates press forming of the hinge reinforcement 62. When the raised welding surface 45 is spot welded to the inner side of the base lateral wall 11B of the outer panel 11, a gap 68 is formed between the inclined surface 66 forming the clearance area 67 and the inner surface of the base lateral wall 11B of the outer panel 11. This configuration prevents, when the vehicle center pillar 61 vibrates, unpleasant noise that could be caused by the outer surface of the reinforcement lateral wall 13B of the hinge reinforcement 62 rubbing or hitting the inner surface of the base lateral wall 11B of the outer panel 11.

Figure 16:
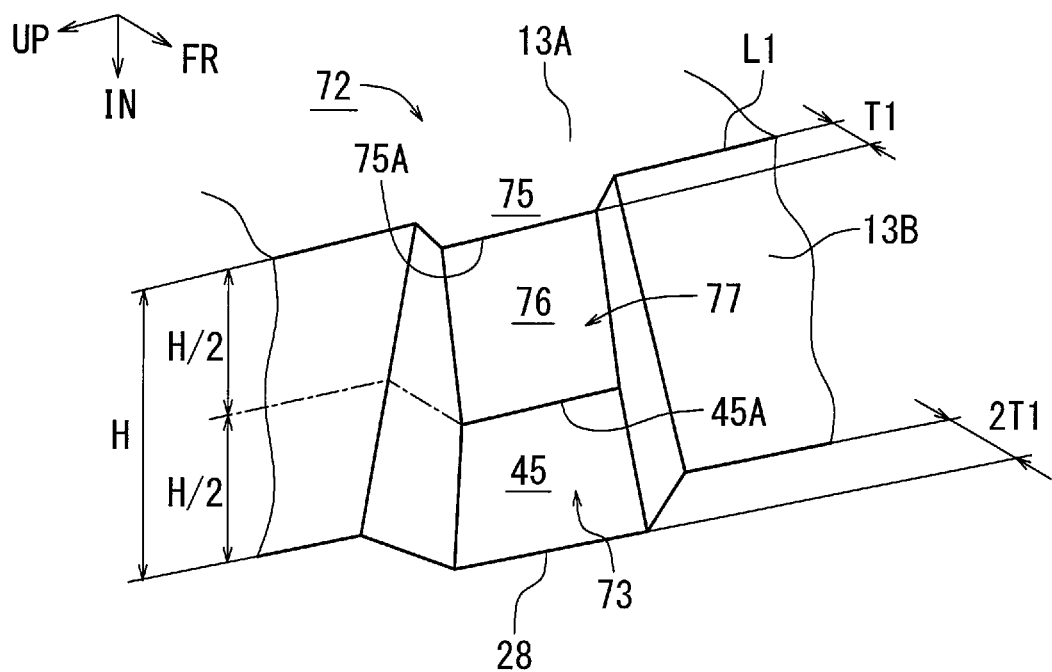
FIG. 16 is an enlarged perspective view of a welding projection according to a fifth embodiment.

[Fifth Embodiment.] The configuration of the vehicle center pillar 71 of a fifth embodiment will now be described with reference to FIGS. 16 and 17. The same reference numerals as those of the configuration of the vehicle center pillar 1 of the first embodiment shown in FIGS. 1 to 9 indicate the same or corresponding features as those of the configuration of the vehicle center pillar 1 of the first embodiment. The same reference numerals as those of the configuration of the vehicle center pillar 41 of the second embodiment shown in FIGS. 10 and 11 indicate the same or corresponding features as those of the configuration of the vehicle center pillar 41 of the second embodiment.

The configuration of the vehicle center pillar 71 of the fifth embodiment is substantially the same as the configuration of the vehicle center pillar 61 of the fourth embodiment. However, the vehicle center pillar 71 of the fifth embodiment is different in that it includes a hinge reinforcement 72 instead of the hinge reinforcement 62 of the fourth embodiment.

The hinge reinforcement 72 has substantially the same configuration as the hinge reinforcement 62 of the fourth embodiment. However, the hinge reinforcement 72 is different in that it includes a fifth embodiment welding projection 73 instead of the fourth embodiment welding projection 63. The other features may be the same as those of the hinge reinforcement 62 of the fourth embodiment, and will not be described again.

The configuration of the fifth embodiment welding projection 73 will be described with reference to FIGS. 16 and 17. As shown in FIGS. 16 and 17, the welding projection 73 has substantially the same configuration as the fourth embodiment welding projection 63. However, the end surface of the fifth embodiment welding projection 73 proximate to the ridge L1 is formed as an extended portion 75 by coplanarly extending the surface of the reinforcement connecting wall 13A on the outer side in the vehicle width direction outwardly by a height T1 (e.g. T1=2 mm).

Consequently, the fifth embodiment welding projection 73 includes an inclined surface 76 that inclines obliquely inward over the entire section that extends from the edge 45A on the outer side in the vehicle width direction of the raised welding surface 45 to the outer edge 75A of the extended portion 75. This creates a clearance area 77 having an outward raising height smaller than that of the raised welding surface 45 on the side of the raised welding surface 45 proximate to the ridge L1.

The fifth embodiment welding projection 73 includes the raised welding surface 45 that protrudes outward by a height 2T1 (e.g. 2T1=4 mm) over the section that extends along the vehicle width direction from the inward edge 28 to the center of the reinforcement lateral wall 13B. The width of the raised welding surface 45 as measured in the vehicle width direction is about half H/2 of the width of the first embodiment raised welding surface 26 as measured in the vehicle width direction.

Figure 17:
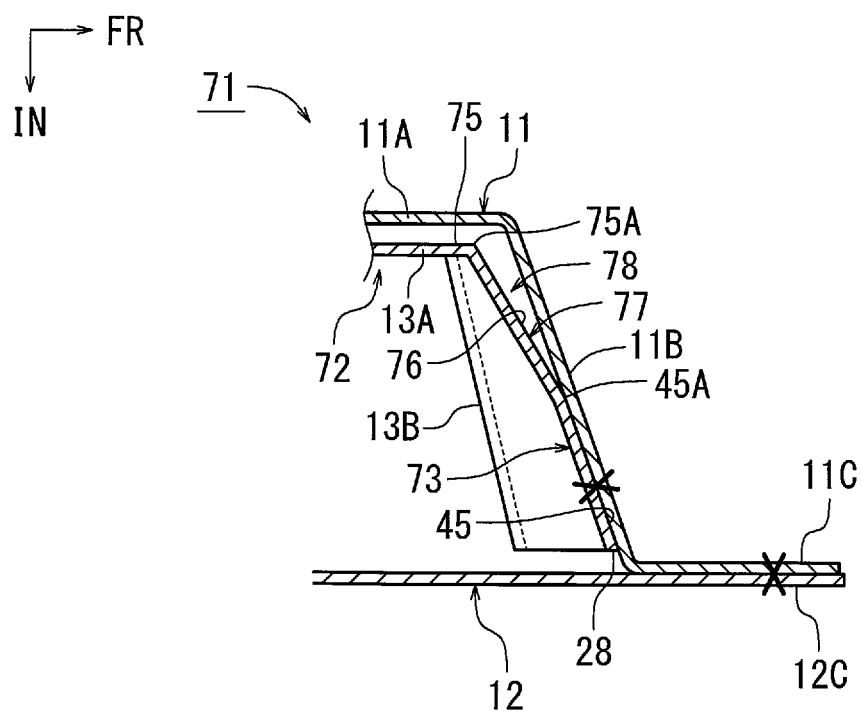
FIG. 17 is a cross-sectional view of a main part of the welding projection of the fifth embodiment welded to the inner side of a vehicle center pillar.

Accordingly, as shown in FIG. 17, when the reinforcement lateral walls 13B are spot welded at each raised welding surface 45 to the inner side of the base lateral walls 11B of the outer panel 11, a gap 78 is formed between the inclined surface 76 forming the clearance area 77 and the inner surface of the base lateral wall 11B of the outer panel 11. In FIG. 17, the welding spots are indicated by X marks. The welding may be performed not only by spot welding but also by any other welding method such as laser welding.

The hinge reinforcement (or vehicle reinforcement member) 72 of the fifth embodiment configured as described above may have the same advantages as the hinge reinforcement 62 of the fourth embodiment as well as the following. The inner surface of the extended portion 75 of the fifth embodiment welding projection 73 is coplanar with the inner surface of the reinforcement connecting wall 13A. This configuration facilitates press forming of the hinge reinforcement 72.

Figure 18:
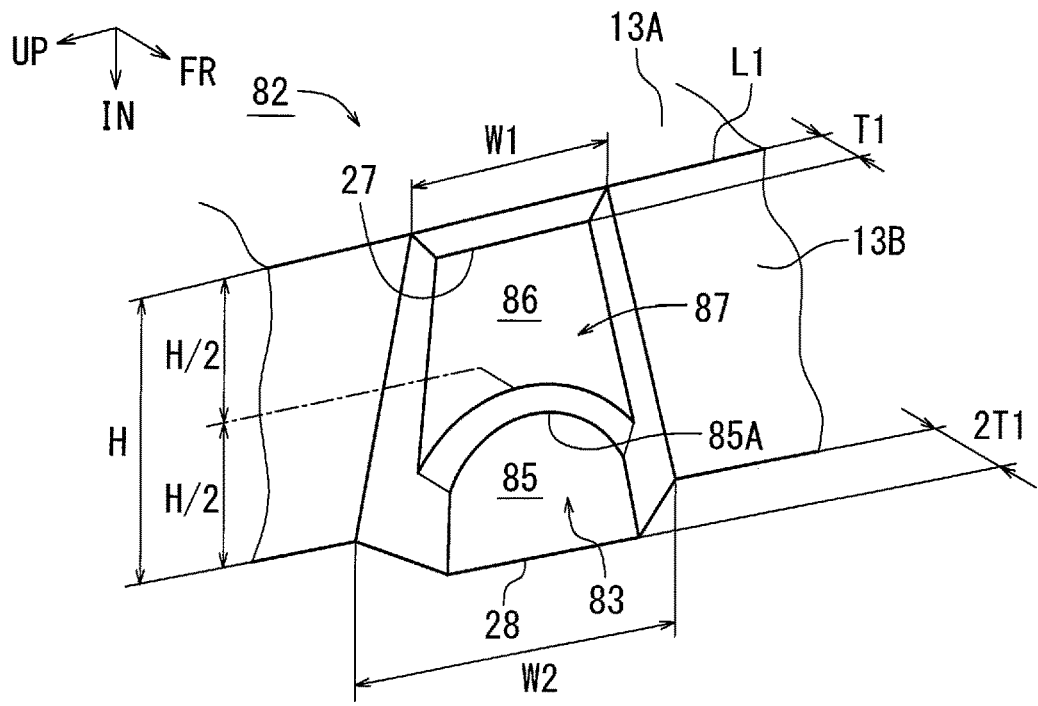
FIG. 18 is an enlarged perspective view of a welding projection according to a sixth embodiment.

[Sixth embodiment.] The configuration of the vehicle center pillar 81 of a sixth embodiment will now be described with reference to FIGS. 18 and 19. The same reference numerals as those of the configuration of the vehicle center pillar 1 of the first embodiment shown in FIGS. 1 to 9 indicate the same or corresponding features as those of the configuration of the vehicle center pillar 1 of the first embodiment. The same reference numerals as those of the configuration of the vehicle center pillar 41 of the second embodiment shown in FIGS. 10 and 11 indicate the same or corresponding features as those of the configuration of the vehicle center pillar 41 of the second embodiment.

The configuration of the vehicle center pillar 81 of the sixth embodiment is substantially the same as the configuration of the vehicle center pillar 41 of the second embodiment. However, the vehicle center pillar 81 of the sixth embodiment is different in that it includes a hinge reinforcement 82 instead of the hinge reinforcement 42.

The hinge reinforcement 82 has substantially the same configuration as the hinge reinforcement 42 of the second embodiment. However, the hinge reinforcement 82 is different in that it includes a sixth embodiment welding projection 83 instead of the second embodiment welding projection 43. The other features may be the same as those of the hinge reinforcement 42 of the second embodiment, and will not be described again.

The configuration of the sixth embodiment welding projection 83 will be described with reference to FIGS. 18 and 19. As shown in FIGS. 18 and 19, the sixth embodiment welding projection 83 includes a raised welding surface 85 which, as compared with the first embodiment raised welding surface 26, further protrudes outward by a height T1 (e.g. T1=2 mm) over the section that extends along the vehicle width direction from the inward edge 28 to the center of the reinforcement lateral wall 13B.

The sixth embodiment raised welding surface 85 has a front shape with a semicircular edge 85A on the outer side in the vehicle width direction, convex outward in the vehicle width direction, and extends at the center of the semicircular arc to the center in the vehicle width direction of the reinforcement lateral wall 13B. In other words, the width of the raised welding surface 85 as measured along the vehicle width direction from the inward edge 28 to the vertex of the outward, semicircular edge 85A is about half H/2 of the width H of the first embodiment raised welding surface 26 as measured in the vehicle width direction.

Accordingly, the sixth embodiment raised welding surface 85 protrudes outward by a height 2T1 (e.g. 2T1=4 mm) that is twice the raising height T1 of the first embodiment raised welding surface 26. The sixth embodiment raised welding surface 85 is flat in order to secure the joint strength of the spot weld joining the raised welding surface 85 and the base lateral wall 11B of the outer panel 11. The raising height of the sixth embodiment raised welding surface 85 with respect to the base surface of the reinforcement lateral wall 13B is not limited to twice the raising height T1 of the first embodiment raised welding surface 26. but can be any larger than the height T1.

Consequently, the sixth embodiment welding projection 83 includes a step surface 86 which is lowered inward by a height difference T1 (e.g. T1=2 mm) over the section that extends from the edge 85A on the outer side in the vehicle width direction of the raised welding surface 85 to the edge 27 proximate to the ridge L1. Specifically, the step surface 86 extends from the edge 27 of the welding projection 83 proximate to the ridge L1, inwardly in the vehicle width direction, to a location slightly more outward in the vehicle width direction than the edge 85A on the outer side in the vehicle width direction of the raised welding surface 85. The step surface 86 then turns outward to the edge 85A on the outer side in the vehicle width direction of the raised welding surface 85. As a result, the sixth embodiment welding projection 83 includes, on the side of the raised welding surface 85 proximate to the ridge L1, a clearance area 87 having a smaller outward raising height than the raised welding surface 85.

Figure 19:
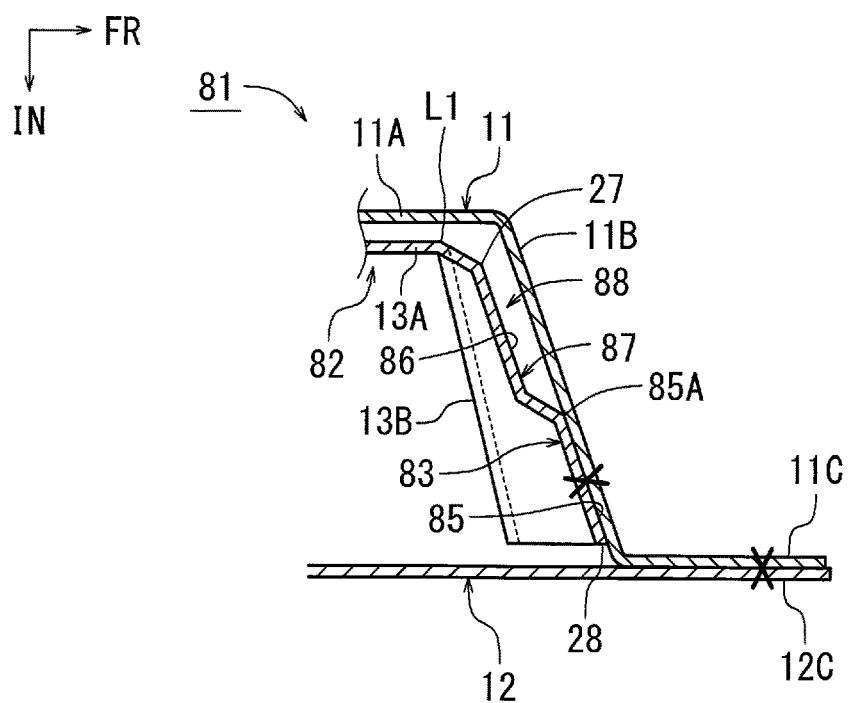
FIG. 19 is a cross-sectional view of a main part of the welding projection of the sixth embodiment welded to the inner side of a vehicle center pillar.

Accordingly, as shown in FIG. 19, when the reinforcement lateral walls 13B are spot welded at each raised welding surface 85 to the inner side of the base lateral walls 11B of the outer panel 11, a gap 88 is formed between the step surface 86 forming the clearance area 87 and the inner surface of the base lateral wall 11B of the outer panel 11. In FIG. 19, the welding spots are indicated by X marks. The welding may be performed not only by spot welding but also by any other welding method such as laser welding.

The hinge reinforcement (or vehicle reinforcement member) 82 of the sixth embodiment configured as described above may have the same advantages as the first embodiment hinge reinforcement 13 as well as the following. The sixth embodiment welding projection 83 includes the raised welding surface 85 whose front shape has a semicircular edge on the outer side in the vehicle width direction and which protrudes outward by a height 2T1 (e.g. 2T1=4 mm) over the section that extends along the vehicle width direction from the inward edge 28 to the center of the reinforcement lateral wall 13B. This configuration allows an increased raising height of the raised welding surface 85 with respect to the reinforcement lateral wall 13B, and thereby prevents wrinkles from occurring in press forming of the hinge reinforcement 82. Furthermore, the configuration reduces the area to be controlled within the raised welding surface 85 and thereby facilitates the dimensional quality control of the hinge reinforcement 82.

The clearance area 87 of the sixth embodiment welding projection 83 is formed by the step surface 86 that is recessed inward from the raised welding surface 85 by a height difference T1 (e.g. T1=2 mm), This configuration facilitates press forming of the hinge reinforcement 82. When the sixth embodiment raised welding surface 85 is spot welded to the inner side of the base lateral wall 11B of the outer panel 11, a gap 88 is formed between the step surface 86 forming the clearance area 87 and the inner surface of the base lateral wall 11B of the outer panel 11. This configuration reduces, when the vehicle center pillar 81 vibrates, unpleasant noise that could be caused by the outer surface of the reinforcement lateral wall 13B of the hinge reinforcement 82 rubbing or hitting the inner surface of the base lateral wall 11B of the outer panel 11.

Figure 20:
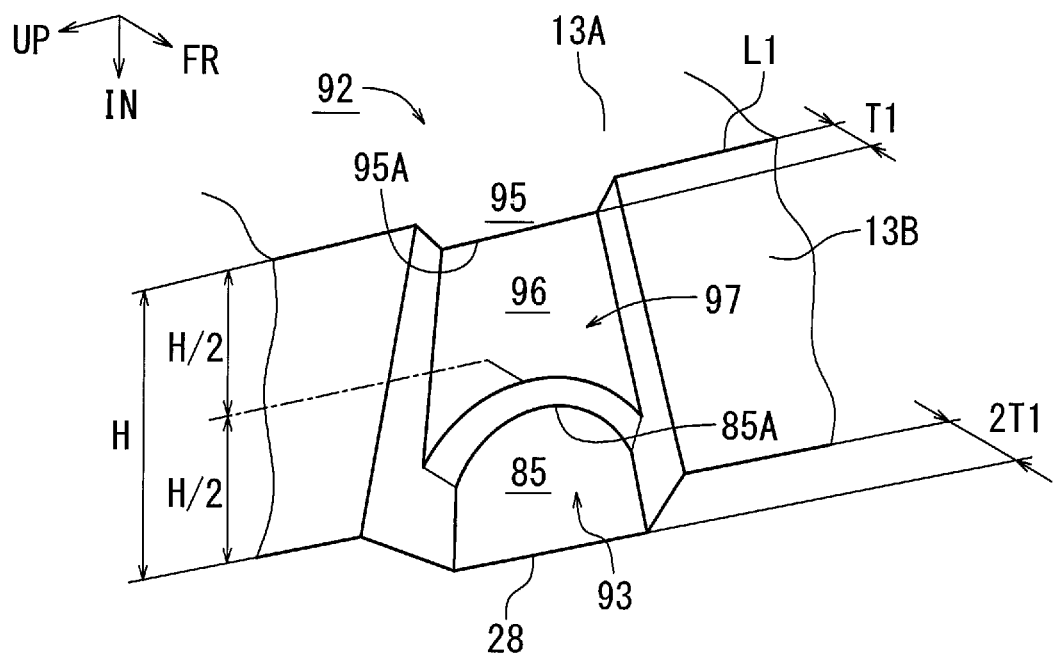
FIG. 20 is an enlarged perspective view of a welding projection according to a seventh embodiment.

[Seventh embodiment.] The configuration of the vehicle center pillar 91 of a seventh embodiment will now be described with reference to FIGS. 20 and 21. The same reference numerals as those of the configuration of the vehicle center pillar 1 of the first embodiment shown in FIGS. 1 to 9 indicate the same or corresponding features as those of the configuration of the vehicle center pillar 1 of the first embodiment. The same reference numerals as those of the configuration of the vehicle center pillar 81 of the sixth embodiment shown in FIGS. 18 and 19 indicate the same or corresponding features as those of the configuration of the vehicle center pillar 81 of the sixth embodiment.

The configuration of the vehicle center pillar 91 of the seventh embodiment is substantially the same as the configuration of the vehicle center pillar 81 of the sixth embodiment. However, the vehicle center pillar 91 of the seventh embodiment is different in that it includes a hinge reinforcement 92 instead of the hinge reinforcement 82 of the sixth embodiment.

The hinge reinforcement 92 has substantially the same configuration as the hinge reinforcement 82 of the sixth embodiment. However, the hinge reinforcement 92 is different in that it includes a seventh embodiment welding projection 93 instead of the sixth embodiment welding projection 83. The other features may be the same as those of the hinge reinforcement 82 of the sixth embodiment, and will not be described again.

The configuration of the seventh embodiment welding projection 93 will be described with reference to FIGS. 20 and 21. As shown in FIGS. 20 and 21, the welding projection 93 has substantially the same configuration as the sixth embodiment welding projection 83. However, the end surface of the seventh embodiment welding projection 93 proximate to the ridge L1 is formed as an extended portion 95 by coplanarly extending the surface on the outer side in the vehicle width direction of the reinforcement connecting wall 13A outward by a height T1 (e.g. T1=2 mm).

Consequently, the seventh embodiment welding projection 93 includes a step surface 96 which is lowered inward by a height difference T1 (e.g. T1=2 mm) and extends from the edge 85A on the outer side in the vehicle width direction of the raised welding surface 85 to the outer edge 95A of the extended portion 95. Specifically, the step surface 96 extends from the outer edge 95A of the extended portion 95, inwardly in the vehicle width direction to a location slightly more outward in the vehicle width direction than the edge 85A on the outer side in the vehicle width direction of the raised welding surface 85. The step surface 96 then turns outward to the edge 85A on the outer side in the vehicle width direction of the raised welding surface 85.

As a result, the seventh embodiment welding projection 93 includes a clearance area 57 having an outward raising height smaller than that of the raised welding surface 85 on the side of the raised welding surface 85 proximate to the ridge L1. The seventh embodiment welding projection 93 includes the raised welding surface 85 that protrudes outward by a height 2T1 (e.g. 2T1=4 mm) over the section that extends along the vehicle width direction from the inward edge 28 to the center of the reinforcement lateral wall 13B.

Figure 21:
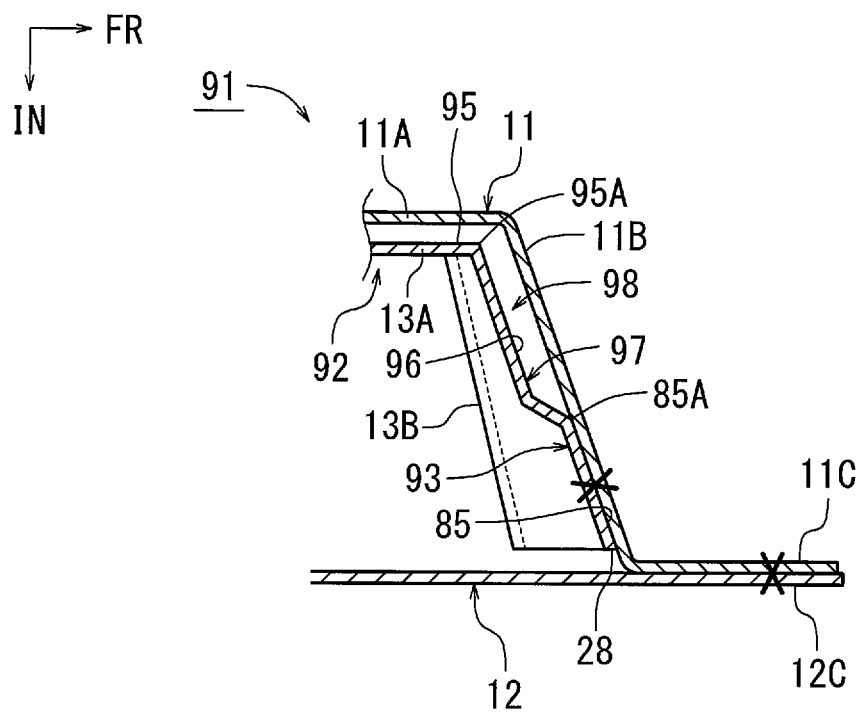
FIG. 21 is a cross-sectional view of a main part of the welding projection of the seventh embodiment welded to the inner side of a vehicle center pillar.

Accordingly, as shown in FIG. 21, when the reinforcement lateral walls 13B are spot welded at each raised welding surface 85 to the inner side of the base lateral walls 11B of the outer panel 11, a gap 98 is formed between a step surface 96 forming the clearance area 97 and the inner surface of the base lateral wall 11B of the outer panel 11. In FIG. 21, a welded spot is indicated by an X mark. The welding may be performed not only by spot welding but also by any other welding method such as laser welding.

The hinge reinforcement (or vehicle reinforcement member) 92 of the seventh embodiment configured as described above may have the same advantages as the hinge reinforcement 82 of the sixth embodiment as well as the following. The inner surface of the extended portion 95 of the seventh embodiment welding projection 93 is coplanar with the inner surface of the reinforcement connecting wall 13A. This configuration facilitates the press forming of the hinge reinforcement 92.

Figure 22:
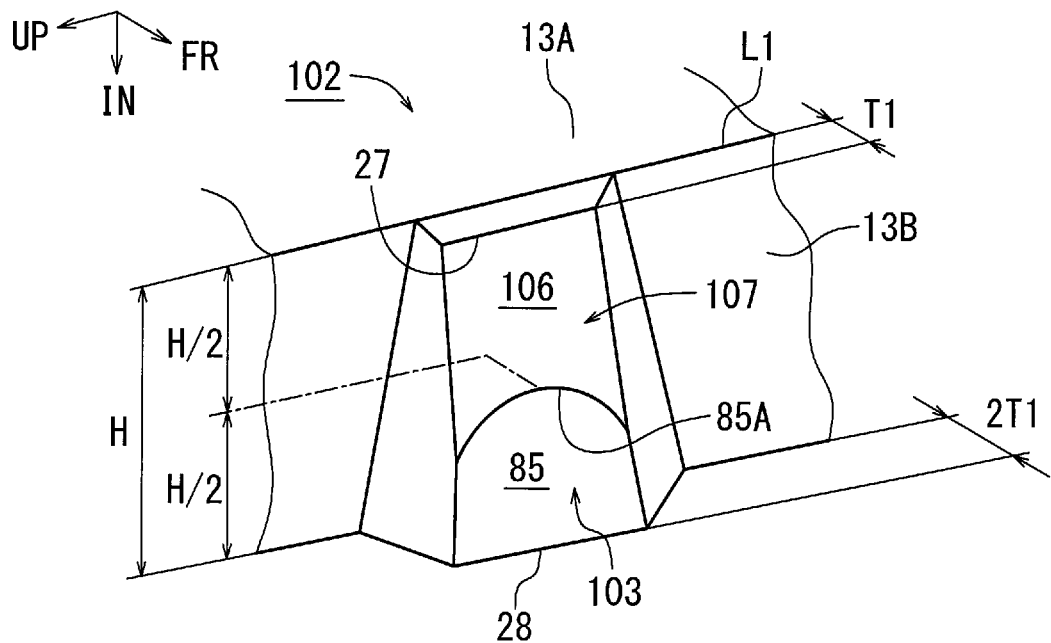
FIG. 22 is an enlarged perspective view of a welding projection according to an eighth embodiment.

[Eighth Embodiment.] Now, the configuration of the vehicle center pillar 101 of a eighth embodiment will be described with reference to FIGS. 22 and 23. The same reference numerals as those of the configuration of the vehicle center pillar 1 of the first embodiment shown in FIGS. 1 to 9 indicate the same or corresponding features as those of the configuration of the vehicle center pillar 1 of the first embodiment. The same reference numerals as those of the configuration of the vehicle center pillar 81 of the sixth embodiment shown in FIGS. 18 and 19 indicate the same or corresponding features as those of the configuration of the vehicle center pillar 81 of the sixth embodiment.

The configuration of the vehicle center pillar 101 of the eighth embodiment is substantially the same as the configuration of the vehicle center pillar 81 of the sixth embodiment. However, the vehicle center pillar 101 of the eighth embodiment is different from the vehicle center pillar 101 in that it includes a hinge reinforcement 102 instead of the hinge reinforcement 82 of the sixth embodiment.

The hinge reinforcement 102 has substantially the same configuration as the hinge reinforcement 82 of the sixth embodiment. However, the hinge reinforcement 102 is different in that it includes an eighth embodiment welding projection 103 instead of the sixth embodiment welding projection 83. The other features may be the same as those of the hinge reinforcement 82 of the sixth embodiment, and will not be described again.

The configuration of the eighth embodiment welding projection 103 will be described with reference to FIGS. 22 and 23. As shown in FIG. 22 and FIG. 23, the welding projection 103 includes the raised welding surface 85 whose front shape has a semicircular edge 85A on the outer side in the vehicle width direction and which protrudes outward by height 2T1 (e.g. 2T1=4 mm), which is twice the raising height T1 of the first embodiment raised welding surface 26, over the section that extends along the vehicle width direction from the inward edge 28 to the center of the reinforcement lateral wall 13B. That is, the width of the raised welding surface 85 as measured along the vehicle width direction from the inward edge 28 to the vertex of the outward semicircular edge 85A is about half H/2 of the width H of the first embodiment raised welding surface 26 as measured in the vehicle width direction.

The eighth embodiment welding projection 103 includes the inclined surface 106 that inclines obliquely inward over an entire section that extends from the semicircular outer edge 85A of the raised welding surface 85 in the vehicle width direction to the edge 27 of the welding projection 103 proximate to the ridge L1. This creates, on the side of the raised welding surface 85 proximate to the ridge L1, a clearance area 107 having an outward raising height smaller than that of the raised welding surface 85.

Figure 23:
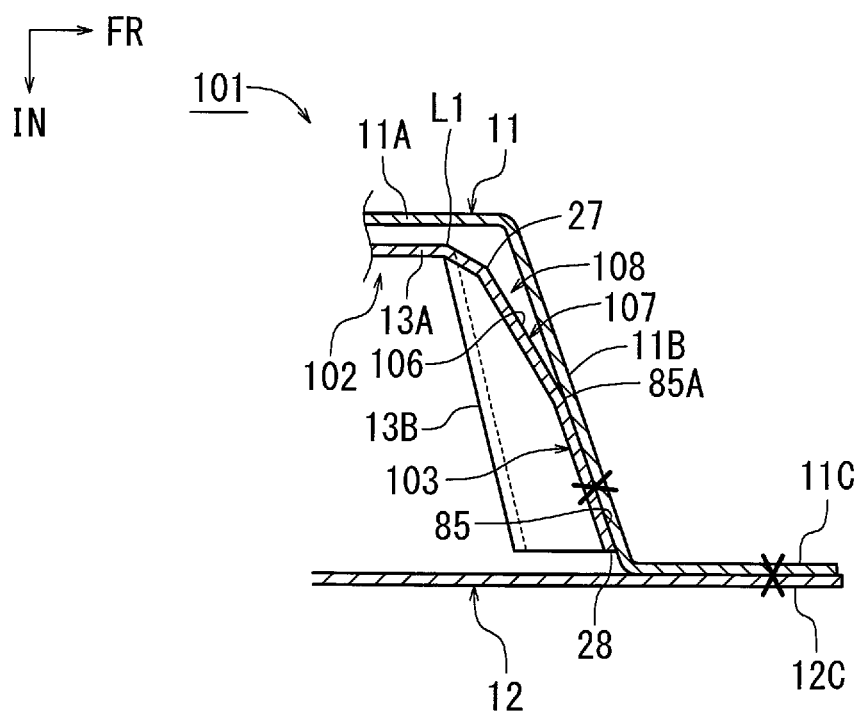
FIG. 23 is a cross-sectional view of a main part of the welding projection of the eighth embodiment welded to the inner side of a vehicle center pillar.

Accordingly, as shown in FIG. 23, when the reinforcement lateral walls 13B are spot welded at each raised welding surface 85 to the inner side of the base lateral walls 11B of the outer panel 11, a gap 108 is formed between the inclined surface 106 forming the clearance area 107 and the inner surface of the base lateral wall 11B of the outer panel 11.

In FIG. 23, the welding spots are indicated by X marks. The welding may be performed not only by spot welding but also by any other welding method such as laser welding.

The hinge reinforcement (or vehicle reinforcement member) 102 of the eighth embodiment configured as described above may have the same advantages as the hinge reinforcement 13 of the first embodiment as well as the following. The eighth embodiment welding projection 103 has the raised welding surface 85 whose front shape has a semicircular edge on the outer side in the vehicle width direction and which protrudes outward by a height 2T1 (e.g. 2T1=4 mm) over the section that extends along the vehicle width direction from the inward edge 28 to the center of the reinforcement lateral wall 13B. This configuration allows an increased raising height of the raised welding surface 85 with respect to the reinforcement lateral wall 13B, and thereby prevents wrinkles from occurring in press forming of the hinge reinforcement 102. Furthermore, the configuration reduces the area to be controlled within the raised welding surface 85 and thereby facilitates the dimensional quality control of the hinge reinforcement 102.

In addition, the clearance area 107 of the eighth embodiment welding projection 103 is formed by the inclined surface 106 which inclines obliquely inward over the entire section that extends from a semicircular edge 85A on the outer side in the vehicle width direction of the raised welding surface 85 to the edge 27 of the welding projection 103 proximate to the ridge L1. This configuration facilitates press forming of the hinge reinforcement 102. When the raised welding surface 85 is spot welded to the inner side of the base lateral wall 11B of the outer panel 11, a gap 108 is formed between the inclined surface 106 forming the clearance area 107 and the inner surface of the base lateral wall 11B of the outer panel 11. This configuration prevents, when the vehicle center pillar 101 vibrates, unpleasant noise that could be caused by the outer surface of the reinforcement lateral wall 13B of the hinge reinforcement 102 rubbing or hitting the inner surface of the base lateral wall 11B of the outer panel 11.

Figure 24:
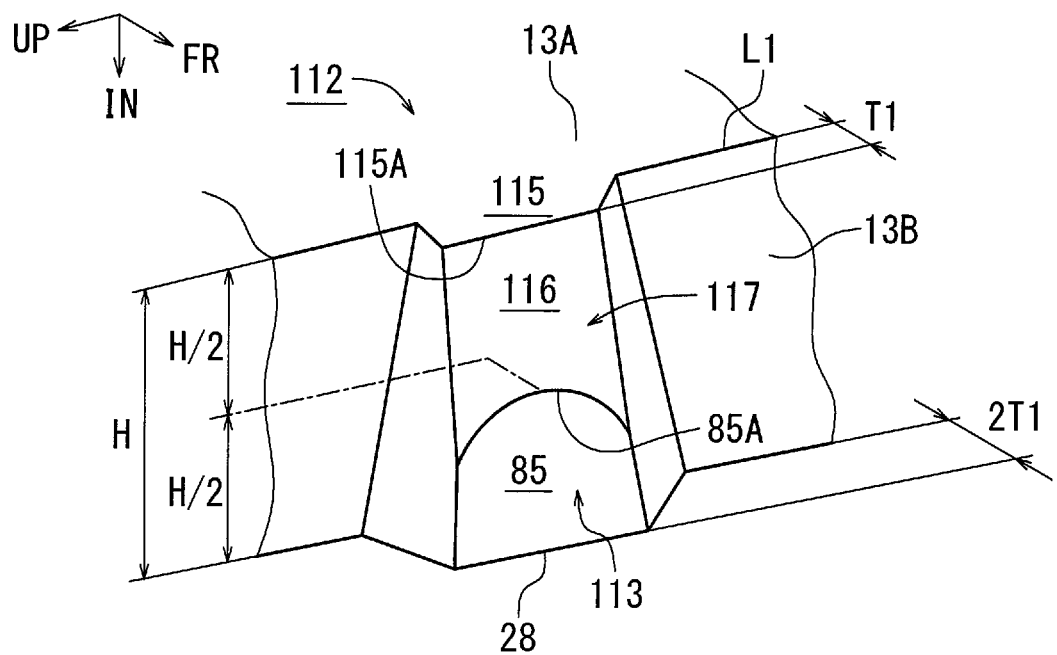
FIG. 24 is an enlarged perspective view of a welding projection according to a ninth embodiment.

[Ninth embodiment.] Now, the configuration of the vehicle center pillar 111 of a ninth embodiment will be described with reference to FIGS. 24 and 25. The same reference numerals as those of the configuration of the vehicle center pillar 1 of the first embodiment shown in FIGS. 1 to 9 indicate the same or corresponding features as those of the configuration of the vehicle center pillar 1 of the first embodiment. The same reference numerals as those of the configuration of the vehicle center pillar 81 of the sixth embodiment shown in FIGS. 18 and 19 indicate the same or corresponding features as those of the configuration of the vehicle center pillar 81 of the sixth embodiment.

The configuration of the vehicle center pillar 111 of the ninth embodiment is substantially the same as the configuration of the vehicle center pillar 101 of the eighth embodiment. However, the vehicle center pillar 111 of the ninth embodiment is different from the vehicle center pillar 111 in that it includes a hinge reinforcement 112 instead of the hinge reinforcement 102 of the eighth embodiment.

The hinge reinforcement 112 has substantially the same configuration as the hinge reinforcement 102 of the eighth embodiment. However, the hinge reinforcement 112 is different in that it includes a ninth embodiment welding projection 113 instead of the eighth embodiment welding projection 103. Other features may be the same as those of the hinge reinforcement 102 of the eighth embodiment, and will not be described again.

The configuration of the ninth embodiment welding projection 113 will be described with reference to FIGS. 24 and 25. As shown in FIGS. 24 and 25, the welding projection 113 has substantially the same configuration as the eighth embodiment welding projection 103. However, the end surface of the ninth embodiment welding projection 113 proximate to the ridge L1 is formed as an extended portion 115 by coplanarly extending the surface on the outer side in the vehicle width direction of the reinforcement connecting wall 13A outward by a height T1 (e.g. T1=2 mm).

The ninth embodiment welding projection 113 includes a raised welding surface 85 whose front shape has a semicircular edge 85A on the outer side in the vehicle width direction and which protrudes outward by a height 2T1 (e.g. 2T1=4 mm), which is twice the raising height T1 of the first embodiment raised welding surface 26, over the section that extends along the vehicle width direction from the inward edge 28 to the center of the reinforcement lateral wall 13B. In other words, the width of the raised welding surface 85 as measured along the vehicle width direction from the inward edge 28 to the vertex of the outward, semicircular edge 85A is about half H/2 of the width H of the first embodiment raised welding surface 26 as measured in the vehicle width direction.

As a result, the ninth embodiment welding projection 113 includes an inclined surface 116 that inclines obliquely inward over the entire section that extends from the semicircular outer edge 85A of the raised welding surface 85 in the vehicle width direction to the outer edge 115A of the extended portion 115. This creates a clearance area 117 having an outward raising height smaller than that of the raised welding surface 85 on the side of the raised welding surface 85 proximate to the ridge L1.

Figure 25:
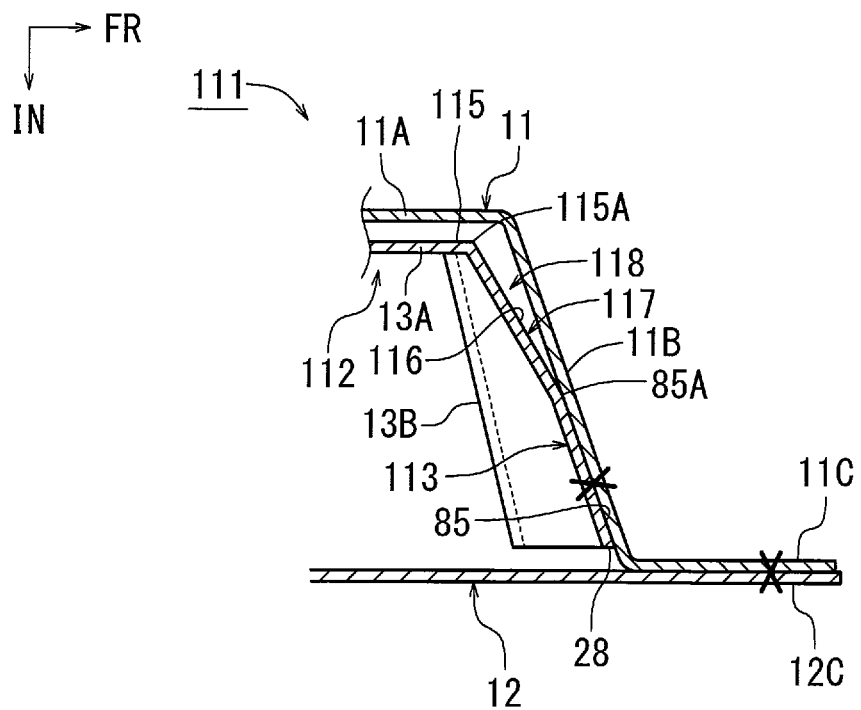
FIG. 25 is a cross-sectional view of a main part of the welding projection of the ninth embodiment welded to the inner side of a vehicle center pillar.

Accordingly, as shown in FIG. 25, when the reinforcement lateral walls 13B are spot welded at each raised welding surface 85 to the inner side of the base lateral walls 11B of the outer panel 11, a gap 118 is formed between the inclined surface 116 forming the clearance area 117 and the inner surface of the base lateral wall 11B of the outer panel 11.

In FIG. 25, the welding spots are indicated by X marks. The welding may be performed not only by spot welding but also by any other welding method such as laser welding.

The hinge reinforcement (or vehicle reinforcement member) 112 of the ninth embodiment configured as described above may have the same advantages as the hinge reinforcement 102 of the eighth embodiment as well as the following. The inner surface of the extended portion 115 of the ninth embodiment welding projection 113 is coplanar with the inner surface of the reinforcement connecting wall 13A, thereby facilitating press forming of the hinge reinforcement 112.

The technology disclosed in the present application is not limited to the first to ninth embodiments, and various improvements, modifications, additions and deletions are possible without departing from the spirit of the technology. For example, the following are possible.

(A) For example, in the first to ninth embodiments, the hinge reinforcements 13, 42, 52, etc. are disposed inside the vehicle center pillars 1, 41, 51, etc. that constitute the vehicle body structure. However, if the vehicle body structure requires a higher permissible limit load, the embodiments can be applied to an elongate reinforcement with a U-shaped cross section that is placed inside a front pillar, rear pillar, roof rail, side sill, etc.

(B) Aspects and embodiments of the technology disclosed herein will be described.

The present disclosure, in one aspect, provides an elongate vehicle reinforcement member having a U-shaped cross section, wherein the vehicle reinforcement member is disposed inside a vehicle structural member and welded to the vehicle structural member, wherein the vehicle structural member comprises opposite base lateral walls, the vehicle reinforcement member comprising: opposite reinforcement lateral walls extending in vehicle height and width directions, each having an outward edge on an outer side in vehicle width direction and an inward edge on an inner side in vehicle width direction, wherein the reinforcement lateral walls are placed along inner sides of the base lateral walls of the vehicle structural member; and a reinforcement connecting wall connecting the outward edges of the reinforcement lateral walls, each reinforcement lateral wall together with the reinforcement connecting wall forming a ridge, each reinforcement lateral wall comprising a row of welding projections, each welding projection protruding outward over the entire width of the reinforcement lateral wall from the ridge to the inward edge of the reinforcement lateral wall, each welding projection having a raised welding surface at which the reinforcement lateral wall is welded to the base lateral wall, the welding projections in each row being arranged at intervals along vehicle height direction. This configuration, in some embodiments, increases the rigidity of the elongate vehicle reinforcement member having a U-shaped cross section, reducing the amount of springback at the time of press forming, and improving the surface position accuracy.

An embodiment may include the raised welding surface extending from the inward edge to a center of the reinforcement lateral wall in vehicle width direction, and the welding projection having a clearance area, the clearance area having an outward raising height, the raising height of the clearance area being smaller than the raising height of the raised welding surface, the clearance area being on a side of the raised welding surface proximate to the ridge. This configuration, in some embodiments, creates a gap between the portion proximate to the ridge than the raised welding surface and the inner side surface of the vehicle structural member. This configuration prevents, when vibration occurs, unpleasant noise due to rubbing or hitting between the outer surface of the reinforcement lateral wall and the inner surface of the vehicle structural member. The configuration also allows an increased raising height of the raised welding surface, and thereby prevents wrinkles from occurring in press forming. Furthermore, the configuration reduces area to be controlled within the raised welding surface and thereby facilitates the dimensional quality control.

An embodiment may include the welding projection having a ridge side edge proximate to the ridge, the raised welding surface having an outward edge on the outer side in vehicle width direction, and the clearance area comprising an inclined surface inclined inward, the inclined surface extending from the outward edge of the raised welding surface to the ridge side edge of the welding projection. This configuration, in some embodiments, facilitates press forming of a vehicle reinforcement member having a welding projection.

An embodiment may include the welding projection having a ridge side edge proximate to the ridge, the raised welding surface having an outward edge on the outer side in vehicle width direction, and the clearance area comprising a step surface recessed inward by a height difference, the step surface extending from the outward edge of the raised welding surface to the ridge side edge of the welding projection. This configuration, in some embodiments, facilitates press forming of a vehicle reinforcement member having a welding projection.

An embodiment may include the welding projection having a sideways trapezoidal front shape, with a ridge side edge proximate to the ridge and an inward edge on the inner side in vehicle width direction, and the welding projection having a first width at the ridge side edge and a second width at the inward edge as measured in vehicle height direction, wherein the first width is smaller than the second width. This configuration, in some embodiments, facilitates removal of the vehicle reinforcement member from the press die, which leads to improved production efficiency.

An embodiment may include the reinforcement connecting wall having an outward surface on the outer side in vehicle width direction, the welding projection having an end surface on the ridge side, the end surface being formed by the outward surface of the reinforcement connecting wall extended coplanarly outward beyond the ridge. This configuration, in some embodiments, the inner surface of the ridge side end of the welding projection is coplanar. This facilitates press forming of the vehicle reinforcement member.

An embodiment may include the welding projection having a ridge side edge proximate to the ridge, the ridge side edge being chamfered obliquely along the ridge. This configuration, in some embodiments, allows a pair of ridges to be formed in a straight line, and it is possible to avoid stress concentration at the base end on the ridge side of the welding projection, thereby improving the bending strength of the vehicle reinforcement member.

The present disclosure, in another aspect, provides a vehicle center pillar vertically arranged on a side of a vehicle, wherein the vehicle reinforcement member configured as above is disposed inside. This configuration, in some embodiments, improves the bending strength of the vehicle center pillar.

The invention claimed is:

1. An elongate vehicle reinforcement member having a U-shaped cross section, wherein the vehicle reinforcement member is disposed inside a vehicle structural member and welded to the vehicle structural member, wherein the vehicle structural member comprises opposite base lateral walls, the vehicle reinforcement member comprising:
opposite reinforcement lateral walls extending in vehicle height and width directions, each having an outward edge on an outer side in vehicle width direction and an inward edge on an inner side in vehicle width direction, wherein the reinforcement lateral walls are placed along inner sides of the base lateral walls of the vehicle structural member; and
a reinforcement connecting wall connecting the outward edges of the reinforcement lateral walls,
each reinforcement lateral wall together with the reinforcement connecting wall forming a ridge,
each reinforcement lateral wall comprising a row of welding projections, each welding projection protruding outward over the entire width of the reinforcement lateral wall from the ridge to the inward edge of the reinforcement lateral wall,
each welding projection having a raised welding surface at which the reinforcement lateral wall is welded to the base lateral wall,
the welding projections in each row being arranged at intervals along vehicle height direction.

2. The vehicle reinforcement member according to claim 1,
the raised welding surface extending from the inward edge to a center of the reinforcement lateral wall in vehicle width direction, and
the welding projection having a clearance area, the clearance area having an outward raising height, the raising height of the clearance area being smaller than the raising height of the raised welding surface, the clearance area being on a side of the raised welding surface proximate to the ridge.

3. The vehicle reinforcement member according to claim 2,
the welding projection having a ridge side edge proximate to the ridge,
the raised welding surface having an outward edge on the outer side in vehicle width direction, and
the clearance area comprising an inclined surface inclined inward, the inclined surface extending from the outward edge of the raised welding surface to the ridge side edge of the welding projection.

4. The vehicle reinforcement member according to claim 2,
the welding projection having a ridge side edge proximate to the ridge,
the raised welding surface having an outward edge on the outer side in vehicle width direction, and
the clearance area comprising a step surface recessed inward by a height difference, the step surface extending from the outward edge of the raised welding surface to the ridge side edge of the welding projection.

5. The vehicle reinforcement member according to claim 1,
the welding projection having a sideways trapezoidal front shape, with a ridge side edge proximate to the ridge and an inward edge on the inner side in vehicle width direction, and
the welding projection having a first width at the ridge side edge and a second width at the inward edge as measured in vehicle height direction, wherein the first width is smaller than the second width.

6. The vehicle reinforcement member according to claim 1,
the reinforcement connecting wall having an outward surface on the outer side in vehicle width direction,
the welding projection having an end surface on the ridge side, the end surface being formed by the outward surface of the reinforcement connecting wall extended coplanarly outward beyond the ridge.

7. The vehicle reinforcement member according to claim 1,
the welding projection having a ridge side edge proximate to the ridge, the ridge side edge being chamfered obliquely along the ridge.

8. A vehicle center pillar vertically arranged on a side of a vehicle, wherein the vehicle reinforcement member according to claim 1, is disposed inside.

* * * * *